United States Patent
Wang et al.

(10) Patent No.: US 11,403,009 B2
(45) Date of Patent: Aug. 2, 2022

(54) STORAGE SYSTEM, AND METHOD AND APPARATUS FOR ALLOCATING STORAGE RESOURCES

(71) Applicant: HANGZHOU HIKVISION SYSTEM TECHNOLOGY CO., LTD., Hangzhou (CN)

(72) Inventors: Weichun Wang, Hangzhou (CN); Qiqian Lin, Hangzhou (CN); Wei Wang, Hangzhou (CN); Weiqiang Xia, Hangzhou (CN)

(73) Assignee: HANGZHOU HIKVISION SYSTEM TECHNOLOGY CO., LTD., Hangzhou (CN)

(*) Notice: Subject to any disclaimer, the term of this patent is extended or adjusted under 35 U.S.C. 154(b) by 89 days.

(21) Appl. No.: 16/964,444

(22) PCT Filed: Jan. 18, 2019

(86) PCT No.: PCT/CN2019/072343
§ 371 (c)(1),
(2) Date: Jul. 23, 2020

(87) PCT Pub. No.: WO2019/144846
PCT Pub. Date: Aug. 1, 2019

(65) Prior Publication Data
US 2021/0048956 A1    Feb. 18, 2021

(30) Foreign Application Priority Data
Jan. 23, 2018 (CN) .......................... 201810063122.3

(51) Int. Cl.
*G06F 3/06* (2006.01)
*G06F 9/50* (2006.01)

(52) U.S. Cl.
CPC .......... *G06F 3/0631* (2013.01); *G06F 3/0604* (2013.01); *G06F 3/0644* (2013.01);
(Continued)

(58) Field of Classification Search
CPC .... G06F 3/0631; G06F 3/0604; G06F 3/0644; G06F 3/0653; G06F 3/0683;
(Continued)

(56) References Cited

U.S. PATENT DOCUMENTS 9,405,757 B2     8/2016 Zhao
10,979,492 B2*   4/2021 Yu ........................... H04L 43/08
(Continued)

FOREIGN PATENT DOCUMENTS

CN    102307221    1/2012
CN    102571991    7/2012
(Continued)

OTHER PUBLICATIONS

Extended European Search Report issued in Corresponding European Application No. 19744254.4, dated Feb. 17, 2021.
(Continued)

*Primary Examiner* — Ryan Bertram
(74) *Attorney, Agent, or Firm* — Norton Rose Fulbright US LLP

(57) ABSTRACT

Disclosed are a storage system, and a method and an apparatus for allocating storage resources. In the storage system, a target management node allocates a target storage node to a monitoring device according to a first storage request; the target storage node allocates a target storage volume to the monitoring device according to a second storage request, allocates a target block group from the target storage volume to the monitoring device, acquires monitoring data in the form of a data stream from the monitoring device, and stores the monitoring data in the target block
(Continued)

group. The storage system may select a management node from a management cluster to allocate a storage node to a monitoring device, and the storage node may allocate a storage position to the monitoring device. The storage position that is allocated to monitoring data can be determined by the management node and the storage node hierarchically.

12 Claims, 4 Drawing Sheets

(52) U.S. Cl.
CPC .......... *G06F 3/0653* (2013.01); *G06F 3/0683* (2013.01); *G06F 9/5011* (2013.01); *G06F 2209/505* (2013.01); *G06F 2209/508* (2013.01); *G06F 2209/5011* (2013.01)

(58) Field of Classification Search
CPC ........... G06F 9/5011; G06F 2209/5011; G06F 2209/505; G06F 2209/508
See application file for complete search history.

(56) References Cited

U.S. PATENT DOCUMENTS

| | | | |
|---|---|---|---|
| 2009/0083861 A1* | 3/2009 | Jones | H04L 63/0892 726/29 |
| 2012/0084419 A1* | 4/2012 | Kannan | H04L 67/1002 709/223 |
| 2012/0191912 A1* | 7/2012 | Kadatch | G06F 3/067 711/119 |
| 2013/0235209 A1* | 9/2013 | Lee | H04N 9/8211 348/159 |
| 2016/0150001 A1* | 5/2016 | Liu | H04L 67/1097 709/223 |
| 2016/0277498 A1* | 9/2016 | Kulkarni | H04L 67/10 |
| 2017/0277709 A1 | 9/2017 | Strauss et al. | |
| 2018/0054476 A1* | 2/2018 | Kyser | H04L 67/1076 |
| 2018/0103090 A1* | 4/2018 | Jin | H04N 21/2743 |
| 2018/0152541 A1* | 5/2018 | Mathison | H04L 67/02 |
| 2018/0173732 A1* | 6/2018 | Wu | G06F 16/1748 |
| 2018/0275874 A1* | 9/2018 | Takahashi | G06F 3/0655 |
| 2019/0166192 A1* | 5/2019 | Ding | G06F 3/0635 |
| 2020/0304373 A1* | 9/2020 | Jin | H04L 67/1076 |

FOREIGN PATENT DOCUMENTS

| | | |
|---|---|---|
| CN | 102932419 | 2/2013 |
| CN | 103067461 | 4/2013 |
| CN | 104113735 | 10/2014 |
| CN | 104796494 | 7/2015 |
| CN | 107092437 | 8/2017 |
| CN | 107104992 | 8/2017 |
| CN | 107343012 | 11/2017 |

OTHER PUBLICATIONS

International Search Report and Written Opinion issued in Corresponding PCT application No. PCT/CN2019/072343, dated Apr. 16, 2019 (English Translation provided).

Office Action issued in Corresponding Chinese Application No. 201810063122.3, dated Jul. 22, 2020 (English Translation provided).

\* cited by examiner

STORAGE SYSTEM, AND METHOD AND APPARATUS FOR ALLOCATING STORAGE RESOURCES

CROSS-REFERENCE TO RELATED APPLICATIONS

The present application is a national phase under 35 U.S.C. § 371 of International Application No. PCT/CN2019/072343, filed Jan. 18, 2019, which claims priority to Chinese patent application No. 201810063122.3 filed with China National Intellectual Property Administration on Jan. 23, 2018 and entitled "Storage system, and method and apparatus for allocating storage resources", each of which are incorporated herein by reference in their entirety.

TECHNICAL FIELD

The present application relates to a field of cloud storage technology, and in particular to a storage system, and a method and an apparatus for allocating storage resources.

BACKGROUND

In video monitoring, a network camera sends a video to a storage system for storage. The video storage, called monitoring data storage thereafter, is an important part of the video monitoring. Therefore, the storage system is also an important part in the video monitoring. The storage system not only impacts the operation of the video monitoring to some extent but also impacts the user experience of monitoring business. Therefore, with a wide application of video monitoring, a requirement for reliability and performance of the monitoring data storage has become increasingly high.

At present, the storage system used in video monitoring generally includes a management node and multiple storage nodes. In storing the monitoring data, a network camera may request storage space from the management node. The management node allocates a storage node to the network camera according to the request of the network camera and allocates a storage position in the allocated storage node for the monitoring data. In this way, the network camera can send the monitoring data to the storage position for storage.

Although the above method can be used to store the monitoring data of the network camera, the network camera needs to request the storage space from the management node before the storage of the data. The management node will receive a request from each network camera for allocating storage space, and allocate a storage node and a storage position in the storage node for each network camera, which causes high load pressure of the management node. In particular, as the number of network cameras in the video monitoring increases, the problem of high load pressure of the management node becomes worse.

SUMMARY

The purpose of embodiments of the present application is to provide a storage system, and a method and an apparatus for allocating storage resources to solve the problem of too high load pressure of a management node. Specifically, the technical solutions are as follows.

In a first aspect, an embodiment of the present application provides a storage system including: a management cluster and a resource pool, wherein the management cluster includes at least one management node; and the resource pool includes at least two storage nodes;

a target management node in the management cluster acquires a first storage request for allocating a storage node to a monitoring device; and allocates the storage node in the resource pool to the monitoring device as a target storage node according to a preset storage node allocation policy, wherein, the target management node is a management node that is determined from the management cluster according to a preset management node allocation policy;

the target storage node receives a second storage request for allocating a storage position to the monitoring device; allocates a target storage volume from storage volumes of the target storage node to the monitoring device according to a preset storage volume allocation policy; allocates a target block group from block groups contained in the target storage volume to the monitoring device according to a preset block group allocation policy; and acquires monitoring data in the form of a data stream from the monitoring device and stores the monitoring data in the target block group.

Optionally, the system further includes an access node(s).

A target access node receives the first storage request sent by the monitoring device and sends the first storage request to the target management node; receives an identifier of the target storage node sent by the target management node and sends the identifier to the monitoring device; receives the second storage request sent by the monitoring device and sends the second storage request to the target storage node; acquires the monitoring data in the form of a data stream from the monitoring device and sends the monitoring data in the form of a data stream to the target block group for storage, wherein, the target access node is an access node allocated to the monitoring device according to a preset access node allocation policy.

Optionally, the system further includes an access node(s).

A target access node generates the first storage request according to an acquired recording plan corresponding to the monitoring device, sends the first storage request to the target management node, and receives an identifier of the target storage node sent by the target management node; generates the second storage request, and sends the second storage request to the target storage node; connects to the monitoring device, acquires monitoring data in the form of a data stream from the monitoring device, and sends the monitoring data in the form of a data stream to the target block group for storage, wherein, the target access node is an access node that is allocated to the monitoring device according to a preset access node allocation policy.

Optionally, the management node allocation policy is determined according to at least one of:

a management node(s) that has been allocated to the monitoring device;

a keep-alive status of each management node in the management cluster; and a load pressure of each management node in the management cluster.

Optionally, the target storage node is further configured for detecting whether a storage space of the target block group is full during storage; and sending a re-request instruction to the monitoring device when detecting that the storage space of the target block group is full, wherein, the re-request instruction is an instruction for instructing the monitoring device to re-request storage resources from the management node.

In a second aspect, an embodiment of the present application provides a method for allocating storage resources, which is applied to a target management node in a storage system, wherein the storage system further includes a resource pool including at least two storage nodes;

wherein the method includes:

acquiring a first storage request for allocating a storage node to a monitoring device; and allocating the storage node in the resource pool to the monitoring device as a target storage node according to a preset storage node allocation policy, so that the target storage node allocates a storage position after receiving a second storage request for allocating the storage position to the monitoring device and stores monitoring data of the monitoring device in the storage position.

Optionally, the storage node allocation policy is determined according to at least one of:

a storage node(s) that has been allocated to the monitoring device;

a keep-alive status of each of the storage nodes in the resource pool;

a remaining storage space of each of the storage nodes in the resource pool; and a load pressure of each of the storage nodes in the resource pool.

Optionally, in case the storage node allocation policy is determined according to the storage node(s) that has been allocated to the monitoring device, allocating the storage node in the resource pool to the monitoring device as the target storage node according to the preset storage node allocation policy includes:

determining a storage node allocated to the monitoring device last time as a first storage node; and allocating a second storage node in the resource pool to the monitoring device as the target storage node according to a preset identifier order table, wherein, the identifier order table records an order of identifiers corresponding to the storage nodes in the resource pool; the second storage node is a node corresponding to a second identifier in the identifier order table; the second identifier is a next identifier of an identifier corresponding to the first storage node in the identifier order table.

Optionally, the storage system further includes an access node(s);

acquiring the first storage request for allocating the storage node to the monitoring device includes:

receiving the first storage request sent by a target access node, wherein, the target access node is an access node allocated to the monitoring device according to a preset access node allocation policy, and the first storage request is a storage request sent by the monitoring device to the target access node or a storage request generated by the target access node.

In a third aspect, an embodiment of the present application provides an method for allocating storage resources, which is applied to a target storage node in a storage system, wherein the storage system includes a management cluster and a resource pool, the management cluster includes at least one management node and the resource pool includes at least two storage nodes, the target storage node is a storage node allocated by the management node to a monitoring device;

wherein the method includes:

receiving a second storage request for allocating a storage position to the monitoring device;

allocating a target storage volume from storage volumes of the target storage node to the monitoring device according to a preset storage volume allocation policy;

allocating a target block group from block groups contained in the target storage volume to the monitoring device according to a preset block group allocation policy; and acquiring monitoring data in the form of a data stream from the monitoring device and storing the monitoring data in the target block group.

Optionally, the method further includes:

detecting whether a storage space of the target block group is full during storage; and when the storage space of the target block group is full, sending a re-request instruction to the monitoring device, wherein the re-request instruction is an instruction for instructing the monitoring device to re-request storage resources from the management node.

Optionally, the storage volume allocation policy is determined according to at least one of:

a storage volume(s) that has been allocated to the monitoring device;

a keep-alive status of each storage volume in the target storage node;

a remaining storage space of each storage volume in the target storage node; and a load pressure of each storage volume in the target storage node.

Optionally, the storage system further includes an access node(s);

receiving the second storage request for allocating the storage position to the monitoring device includes:

receiving the second storage request sent by a target access node, wherein, the target access node is an access node that is allocated to the monitoring device according to a preset access node allocation policy, and the second storage request is a storage request sent by the monitoring device to the target access node or a storage request generated by the target access node;

acquiring the monitoring data in the form of a data stream from the monitoring device and storing the monitoring data in the target block group includes:

receiving the monitoring data in the form of a data stream sent by the target access node and storing the monitoring data in the target block group, wherein, the monitoring data is data that is acquired by the target access node in the form of a data stream from the monitoring device.

Optionally, the block group allocation policy is determined according to at least one of:

a block group(s) that has been allocated to the monitoring device;

a keep-alive status of each block group in the target storage volume;

a remaining storage space of each block group in the target storage volume; and a load pressure of each block group in the target storage volume.

In a fourth aspect, an embodiment of the present application provides an apparatus for allocating storage resources, which is applied to a target access node in a storage system, wherein the storage system includes a management cluster and a resource pool, the resource pool includes at least two storage nodes, and the target access node is an access node that is allocated to a monitoring device according to a preset access node allocation policy;

wherein the method includes:

acquiring a first storage request and sending the first storage request to a target management node in the management cluster, wherein the first storage request is a request for allocating a storage node to the monitoring device;

receiving an identifier of a target storage node sent by the target management node, wherein the target storage node is a storage node allocated by the target management node to the monitoring device;

acquiring a second storage request and sending the second storage request to the target storage node, wherein the second storage request is a request for allocating a storage position to the monitoring device; and acquiring monitoring data in the form of a data stream from the monitoring device and sending the monitoring data in the form of a data stream to a target block group for storage.

Optionally, acquiring the first storage request includes:

receiving the first storage request sent by the monitoring device; or generating the first storage request according to an acquired recording plan corresponding to the monitoring device.

Optionally, acquiring the second storage request includes:

receiving the second storage request sent by the monitoring device; or generating the second storage request.

In a fifth aspect, an embodiment of the present application provides a method for allocating storage resources, which is applied to a monitoring device, the method includes:

sending a first storage request to a target management node in a storage system, wherein the storage system includes a management cluster and a resource pool; the management cluster includes at least one management node; the resource pool includes at least two storage nodes; the first storage request is a request for allocating a storage node to the monitoring device; and the target management node is a management node that is determined from the management cluster according to a preset management node allocation policy;

acquiring a target identifier of a target storage node fed back by the target management node, wherein, the target storage node is a storage node that is allocated by the target management node to the monitoring device according to a preset storage node allocation policy;

sending a second storage request to the target storage node according to the target identifier, wherein the second storage request is a request for allocating a storage position to the monitoring device; and sending monitoring data in the form of a data stream to the target storage node according to a target block group allocated by the target storage node to the monitoring device, so that the target storage node stores the monitoring data in the target block group, wherein, the target block group is a block group that is allocated by the target storage node to the monitoring device from block groups contained in a target storage volume according to a preset block group allocation policy, and the target storage volume is allocated by the target storage node from storage volumes of the target storage node to the monitoring device according to a preset storage volume allocation policy.

Optionally, before sending the first storage request to the target management node in the storage system, the method further includes:

acquiring keep-alive information of the management node;

in case the keep-alive information indicates that at least one management node in the management cluster keeps alive, performing the step of sending a first storage request to a target management node in the storage system; and in case the keep-alive information indicates that no keep-alive management node exists in the management cluster, acquiring a recorded identifier as a target identifier, and performing the step of sending a second storage request to a target storage node according to the target identifier, wherein, the recorded identifier is an identifier of a storage node that has been allocated by the management node to the monitoring device.

Optionally, the method further includes:

receiving a re-request instruction sent by the target storage node, wherein, the re-request instruction is an instruction for instructing the monitoring device to re-request storage resources from the management node; and performing the step of sending a first storage request to a target management node in the storage system.

In a sixth aspect, an embodiment of the present application provides an apparatus for allocating storage resources, which is applied to a target management node in a storage system, wherein the storage system further includes a resource pool including at least two storage nodes;

wherein the apparatus includes:

a first acquiring module configured for acquiring a first storage request for allocating a storage node to a monitoring device;

a first allocation module configured for allocating the storage node in the resource pool to the monitoring device as a target storage node according to a preset storage node allocation policy, so that the target storage node allocates a storage position after receiving a second storage request for allocating the storage position to the monitoring device and stores monitoring data of the monitoring device in the storage position.

Optionally, the storage node allocation policy is determined according to at least one of:

a storage node(s) that has been allocated to the monitoring device;

a keep-alive status of each of the storage nodes in the resource pool;

a remaining storage space of each of the storage nodes in the resource pool; and a load pressure of each of the storage nodes in the resource pool.

Optionally, in case the storage node allocation policy is determined according to the storage node(s) that has been allocated to the monitoring device, the first allocation module includes:

a determining sub-module configured for determining a storage node allocated to the monitoring device last time as a first storage node; and an allocation sub-module configured for allocating a second storage node in the resource pool to the monitoring device as the target storage node according to a preset identifier order table, wherein, the identifier order table records an order of identifiers corresponding to the storage nodes in the resource pool; the second storage node is a node corresponding to a second identifier in the identifier order table; the second identifier is a next identifier of an identifier corresponding to the first storage node in the identifier order table.

Optionally, the storage system further includes an access node(s);

the first acquiring module includes:

a first receiving sub-module configured for receiving the first storage request sent by a target access node, wherein, the target access node is an access node that is allocated to the monitoring device according to a preset access node allocation policy, and the first storage request is a storage request sent by the monitoring device to the target access node or a storage request generated by the target access node.

In a seventh aspect, an embodiment of the present application provides an apparatus for allocating storage resources, which is applied to a target storage node in a storage system, wherein the storage system includes a management cluster and a resource pool, the management cluster includes at least one management node and the resource pool includes at least two storage nodes, the target storage node is a storage node allocated by the management node to a monitoring device;

wherein the apparatus includes:

a first receiving module configured for receiving a second storage request for allocating a storage position to the monitoring device;

a second allocation module configured for allocating a target storage volume from storage volumes of the target storage node to the monitoring device according to a preset storage volume allocation policy;

a third allocation module configured for allocating a target block group from block groups contained in the target storage volume to the monitoring device according to a preset block group allocation policy; and a second acquiring module configured for acquiring monitoring data in the form of a data stream from the monitoring device and storing the monitoring data in the target block group.

Optionally, the apparatus further includes:

a detection module configured for detecting whether a storage space of the target block group is full during storage; and a first sending module configured for when the detection module detects that the storage space of the target block group is full, sending a re-request instruction to the monitoring device, wherein the re-request instruction is an instruction for instructing the monitoring device to re-request storage resources from the management node.

Optionally, the storage volume allocation policy is determined according to at least one of:

a storage volume(s) that has been allocated to the monitoring device;

a keep-alive status of each storage volume in the target storage node;

a remaining storage space of each storage volume in the target storage node; and a load pressure of each storage volume in the target storage node.

Optionally, the storage system further includes an access node(s);

the first receiving module includes:

a second receiving sub-module configured for receiving the second storage request sent by a target access node, wherein, the target access node is an access node allocated to the monitoring device according to a preset access node allocation policy, and the second storage request is a storage request sent by the monitoring device to the target access node or a storage request generated by the target access node;

the second acquiring module includes:

a third receiving sub-module configured for receiving the monitoring data in the form of a data stream sent by the target access node and storing the monitoring data in the target block group, wherein, the monitoring data is data that is acquired by the target access node in the form of a data stream from the monitoring device.

Optionally, the block group allocation policy is determined according to at least one of:

a block group(s) that has been allocated to the monitoring device;

a keep-alive status of each block group in the target storage volume;

a remaining storage space of each block group in the target storage volume; and a load pressure of each block group in the target storage volume.

In an eighth aspect, an embodiment of the present application provides an apparatus for allocating storage resources, which is applied to a target access node in a storage system, wherein the storage system includes a management cluster and a resource pool, the resource pool includes at least two storage nodes, and the target access node is an access node that is allocated to a monitoring device according to a preset access node allocation policy;

wherein the apparatus includes:

a third acquiring module configured for acquiring a first storage request, wherein the first storage request is a request for allocating a storage node to the monitoring device;

a second sending module configured for sending the first storage request to a target management node in the management cluster;

a second receiving module configured for receiving an identifier of a target storage node sent by the target management node, wherein the target storage node is a storage node allocated by the target management node to the monitoring device;

a fourth acquiring module configured for acquiring a second storage request, wherein the second storage request is a request for allocating a storage position to the monitoring device;

a third sending module configured for sending the second storage request to the target storage node;

a fifth acquiring module configured for acquiring monitoring data in the form of a data stream from the monitoring device and sending the monitoring data in the form of a data stream to a target block group for storage.

Optionally, the third acquiring module is further configured for:

receiving the first storage request sent by the monitoring device; or generating the first storage request according to an acquired recording plan corresponding to the monitoring device.

Optionally, the fourth acquiring module is further configured for:

receiving the second storage request sent by the monitoring device; or generating the second storage request.

In a ninth aspect, an embodiment of the present application provides an apparatus for allocating storage resources, which is applied to a monitoring device, the apparatus includes:

a fourth sending module configured for sending a first storage request to a target management node in a storage system, wherein the storage system includes a management cluster and a resource pool; the management cluster includes at least one management node; the resource pool includes at least two storage nodes; the first storage request is a request for allocating a storage node to the monitoring device; and the target management node is a management node that is determined from the management cluster according to a preset management node allocation policy;

an obtaining module configured for obtaining a target identifier of a target storage node fed back by the target management node, wherein, the target storage node is a storage node that is allocated by the target management node to the monitoring device according to a preset storage node allocation policy;

a fifth sending module configured for sending a second storage request to the target storage node according to the target identifier, wherein the second storage request is a request for allocating a storage position to the monitoring device;

a sixth sending module configured for sending monitoring data in the form of a data stream to the target storage node according to a target block group allocated by the target storage node to the monitoring device, so that the target storage node stores the monitoring data in the target block group, wherein, the target block group is a block group that is allocated by the target storage node to the monitoring device from block groups contained in a target storage volume according to a preset block group allocation policy, and the target storage volume is allocated by the target storage node from storage volumes of the target storage node to the monitoring device according to a preset storage volume allocation policy.

Optionally, the apparatus further includes:

a sixth acquiring module configured for acquiring keep-alive information of the management node, and in case the keep-alive information indicates that at least one management node in the management cluster keeps alive, triggering the fourth sending module;

a seventh acquiring module configured for in case the keep-alive information indicates that no keep-alive management node exists in the management cluster, acquiring a recorded identifier as the target identifier and triggering the fifth sending module, wherein, the recorded identifier is an identifier of a storage node that has been allocated by the management node to the monitoring device.

Optionally, the apparatus further includes:

a third receiving module configured for receiving a re-request instruction sent by the target storage node and triggering the fourth sending module, wherein, the re-request instruction is an instruction for instructing the monitoring device to re-request storage resources from the management node.

In a tenth aspect, an embodiment of the present application provides an electronic device including a processor, a communications interface, a memory, and a communication bus, wherein the processor, the communications interface, and the memory communicate with each other via the communication bus;

the memory is configured for storing a computer program;

the processor is configured for performing any one of the methods for allocating storage resources which are applied to a target management node in a storage system when executing the program stored on the memory.

In an eleventh aspect, an embodiment of the present application provides a computer-readable storage medium having stored a computer program thereon, wherein the computer program is executed by a processor, so as to cause the processor to perform any one of the methods for allocating storage resources which are applied to a target management node in a storage system.

In a twelfth aspect, an embodiment of the present application provides an electronic device including a processor, a communications interface, a memory, and a communication bus, wherein the processor, the communications interface, and the memory communicate with each other via the communication bus;

the memory is configured for storing a computer program;

the processor is configured for performing any one of the methods for allocating storage resources which are applied to a target storage node in a storage system when executing the program stored on the memory.

In a thirteenth aspect, an embodiment of the present application provides a computer-readable storage medium having stored a computer program thereon, wherein the computer program is executed by a processor, so as to cause the processor to perform any one of the methods for allocating storage resources which are applied to a target storage node in a storage system.

In a fourteenth aspect, an embodiment of the present application provides an electronic device including a processor, a communications interface, a memory, and a communication bus, wherein the processor, the communications interface, and the memory communicate with each other via the communication bus;

the memory is configured for storing a computer program;

the processor is configured for performing any one of the methods for allocating storage resources which are applied to a target access node in a storage system when executing the program stored on the memory.

In a fifteenth aspect, an embodiment of the present application provides a computer-readable storage medium having stored a computer program thereon, wherein the computer program is executed by a processor, so as to cause the processor to perform any one of the methods for allocating storage resources which are applied to a target access node in a storage system.

In a sixteenth aspect, an embodiment of the present application provides an electronic device including a processor, a communications interface, a memory, and a communication bus, wherein the processor, the communications interface, and the memory communicate with each other via the communication bus;

the memory is configured for storing a computer program;

the processor is configured for performing any one of the methods for allocating storage resources which are applied to a monitoring device when executing the program stored on the memory.

In a technical solution according to the embodiment of the present application, the target management node in the management cluster acquires the first storage request for allocating the storage node to the monitoring device and allocates the target storage node in the resource pool to the monitoring device; after receiving the second storage request for allocating the storage position to the monitoring device, the target storage node allocates the target storage volume from the storage volumes thereof to the monitoring device and allocates the target storage block group to the monitoring device from the block groups contained in the target storage volume; and the target storage node receives the monitoring data in the form of a data stream from the monitoring device and stores the monitoring data in the target block group. Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

An embodiment of the present application provides a storage system, and a method and an apparatus for allocating storage resources to solve the problem of excessive load pressure of the management node. The storage system includes a management cluster and a resource pool. The management cluster includes at least one management node and the resource pool includes at least two storage nodes.

A target management node in the management cluster acquires a first storage request for allocating a storage node to a monitoring device, and allocates a storage node in the resource pool to the monitoring device as a target storage node according to a preset storage node allocation policy; wherein, the target management node is a management node determined from the management cluster according to a preset management node allocation policy.

The target storage node receives a second storage request for allocating a storage position to the monitoring device. The target storage node allocates a target storage volume from storage volumes thereof to the monitoring device according to a preset storage volume allocation policy. The target storage node allocates a target block group from block groups contained in the target storage volume to the monitoring device according to a preset block group allocation policy. The target storage node acquires monitoring data in the form of a data stream from the monitoring device and stores the monitoring data in the target block group.

Through a technical solution according to the embodiment of the present application, a management node may be selected from a management cluster for allocating a storage node to a monitoring device, and then a storage position in the storage node is allocated to the monitoring device. In view of this, the storage position that is allocated for the monitoring data may be determined by both of the management node and the storage node hierarchically. A different management node may be selected for each storage request. In this way, the load pressure of the managing management nodes in the management cluster is reduced.

First, a storage system according to the embodiment of the present application is described in detail below.

Figure 1:
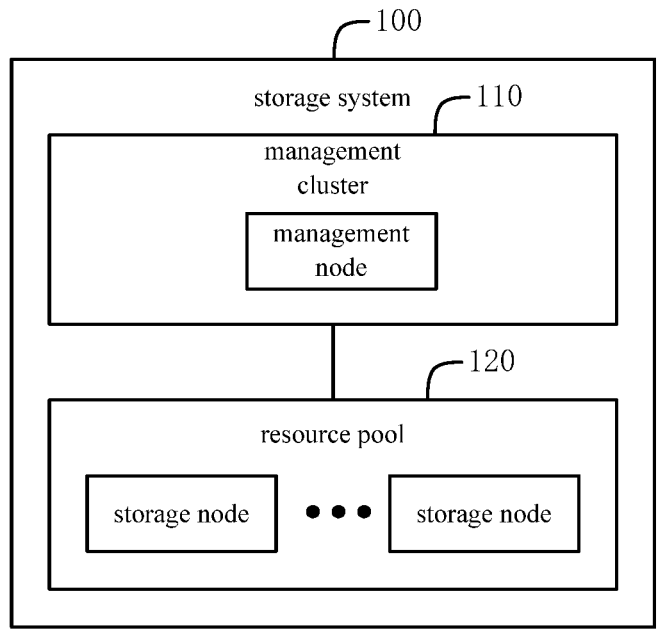
FIG. 1 is a structural diagram of a storage system according to an embodiment of the present application.

As shown in FIG. 1, the storage system according to the embodiment of the present application includes a management cluster 110 and a resource pool 120. The management cluster 110 includes at least one management node, and the resource pool 120 includes at least two storage nodes.

A target management node in the management cluster 110 acquires a first storage request for allocating a storage node to a monitoring device, and allocates a storage node in the resource pool 120 to the monitoring device as a target storage node according to a preset storage node allocation policy, wherein, the target management node is a management node determined from the management cluster 110 according to a preset management node allocation policy.

The target storage node receives a second storage request for allocating a storage position to the monitoring device, allocates a target storage volume from storage volumes thereof to the monitoring device according to a preset storage volume allocation policy, allocates a target block group from block groups contained in the target storage volume to the monitoring device, and acquires monitoring data in the form of a data stream from the monitoring device and stores the monitoring data in the target block group.

The management cluster 110, the resource pool 120, the target management node, and the target storage node are respectively described as follows.

1. The management cluster 110 includes at least one management node. Each management node may receive a storage request from the monitoring device and allocate a storage node to a monitoring device.

A device such as the monitoring device or an access node may send the storage request to the management cluster 110. The sent storage request is configured for allocating the storage node to the monitoring device and is considered as the first storage request. The monitoring device or the access node sends the first storage request, which may be received by one management node in the management cluster 110. The management node that receives the first storage request may be considered as the target management node. In other words, after the device such as the monitoring device or the access node sends the first storage request to the management cluster 110, it is possible to determine the target management node in the management cluster 110. The determined target management node responds to the first storage request.

In an implementation, the target management node may be determined through a program in the storage system 100, which may be a preset program. In order to store the monitoring data, the monitoring device may send the first storage request to the program, and after receiving the first storage request, the program may determine the target management node from the management cluster 110 for responding to the first storage request.

In an implementation, the program may preset a virtual IP address, and IP addresses of management nodes in the management cluster 110 are stored in the program. The device such as the monitoring device or the access node may send the first storage request to the virtual IP address. The program may determine the target management node for responding to the first storage request from the management cluster 110 and acquire an IP address of the target management node from the stored IP addresses of the management nodes. The program then forwards the first storage request to the IP address of the target management node. In this way, the target management node can receive the first storage request sent by the monitoring device.

The target management node may be determined from the management cluster 110 according to a preset management allocation policy. According to different requirements, different management node allocation policies may be set. For example, in order to balance load pressures of the management nodes in the management cluster 110, the management node allocation policy may be a rotation policy for determining the management nodes in the management cluster 110 in a certain order as the target management node. In this way, the case that one management node is used as the target management node for a long time can be avoided, reducing the usage of the same management node.

The management node allocation policy will be described in detail below, and will not be described here.

A mutual standby relationship may exist among all of the management nodes in the management cluster 110. In case a management node in the management cluster 110 fails, the failed management node is no longer taken as a selection object when the management node is determined, and the target management node is determined from non-failed management nodes. In this way, even if there are some failed management nodes in the management cluster 110, a non-failed target management node can be determined, so that the failure rate of the storage system 100 is reduced.

Furthermore, in a case where the determined target management node fails, one management node may be re-determined as the target management node from other management nodes in the management cluster 110 for responding to the first storage request from the monitoring device and allocating the storage node to the monitoring device.

There are different methods for re-determining the target management node. For example, one management node may be arbitrarily selected from the non-failed management nodes as the target management node. Alternatively, based on a preset identifier order table for the management nodes, a next identifier of an identifier corresponding to the failed management node is taken as a target identifier, and a management node corresponding to the target identifier is determined as the target management node. Of course, methods for re-determining the target management node are not limited to the two methods above. There may be other methods, which are not limited herein.

For example, the management cluster 110 includes three management nodes A, B and C. An identifier corresponding to the management node A is A; an identifier corresponding to the management node B is B, and an identifier corresponding to the management node C is C. An order in the reset identifier order table is: A, B, C. For the first storage request A sent by the monitoring device A, the management node A is determined as the target management node, and then the management node A may respond to the first storage request A and allocate the storage node to the monitoring device A. In a case where the management node A fails, it is known from the preset identifier order table that the identifier B is the next identifier of the identifier A corresponding to the management node A, and the identifier B corresponds to the management node B, thus the management node B may be re-determined as a new target management node.

Through the fault tolerance mechanism above, a strong centralization of the management nodes is avoided and a problem that the storage system 100 is unable to operate once the management node fails is avoided, reducing the failure rate of the storage system 100 and improving the working efficiency of the storage system 100.

2. The resource pool 120 includes at least two storage nodes. The resource pool 120 may be considered as a set of several storage nodes. The resource pool 120 may be a virtual concept and may not have actual physical storage space.

The storage system 100 may have one resource pool 120 or at least two resource pools 120. Accordingly, there may be multiple methods for assigning the storage nodes to the resource pools 120 due to different numbers of the resource pools 120. In an implementation, when the storage system 100 has one resource pool 120, the storage nodes contained in the storage system 100 may belong to the same resource pool 120.

In an implementation, the storage nodes are assigned to the resource pools based on the types of the storage nodes. The types of the storage nodes includes: business type, storage space, monitoring data storage manner, and monitoring data coverage manner, and the like. For example, the storage nodes are assigned to the resource pools 120 based on the business type. Storage nodes storing video data are determined to belong to a same resource pool 120, and storage nodes storing video images are determined to belong to a same resource pool 120. The storage nodes may be assigned to the resource pools 120 based on the monitoring data storage manner. Storage nodes for distribution storage of the monitoring data are determined to belong to a same resource pool 120, and storage nodes for centralized storage of the monitoring data are determined to belong to a same resource pool 120. Of course, in an implementation, the types of storage nodes are not limited to the above four types, and may include other types, which are not listed here.

3. The target management node may be a management node determined from the management cluster 110 according to the preset management node allocation policy.

The target management node may acquire the first storage request for allocating the storage node to the monitoring device. The target management node is a management node determined from the management cluster 110 according to the first storage request. There may be at least three manners for acquiring the first storage request. In a first acquiring manner, the monitoring device directly sends the first storage request to the target management node. In a second acquiring manner, the storage system 100 further includes an access node; the first storage request is sent to the access node by the monitoring device, and then the first storage request is sent to the target management node by the access node. In a third acquiring method, the storage system 100 further includes the access node; the access node generates the first storage request and sends it to the target management node.

For the first acquiring manner, the monitoring device and the target management node are communicated. The first storage request received by the target management node is directly from the monitoring device. In other words, the monitoring device directly sends the first storage request to the target management node. For the second acquiring manner, the first storage request received by the target management node is directly from the access node. In other words, the access node directly sends the first storage request to the target management node. This acquiring manner will be described in the following implementation, and will not be described here. For the third acquiring manner, the first storage request received by the target management node is directly from the access node and the first storage request is also generated by the access node. In other words, after generating the first storage request, the access node directly sends the first storage request to the target management node. This acquiring manner will be described in the following implementation, and will not be described here.

In an implementation, each storage node may correspond to one identifier. Identifiers of respective storage nodes are different. After determining the target storage node from the resource pool 120, the target management node may feed back an identifier of the target storage node to the monitoring device. After acquiring the identifier of the target storage node, the monitoring device may learn the target storage node allocated by the target management node, and then may send the second storage request to the target storage node for requesting storage space.

There may be at least two manners that the target management node feeds back the identifier of the target storage node to the monitoring device. In a first feedback manner, which corresponds to the first acquiring manner, the target management node directly sends the identifier of the target storage node to the monitoring device. In this way, the monitoring device can directly acquire the identifier of the target storage node. In a second feedback manner, which corresponds to the second acquiring manner, the storage system 100 includes the access node; the target management node send the identifier of the target storage node to the access node, and then, the access node forward the identifier of the target storage node to the monitoring device. In this way, the monitoring device may acquire the identifier of the target storage node via the access node.

In an embodiment of the present application, for the storage request from the monitoring device, the target management node allocates the target storage node to the monitoring device, and then the target storage node further allocates the storage position to the monitoring device. Through the embodiment, the workload of the target management node is reduced, and thus the load pressure of the target management node is reduced and the dependence on the target management node by the monitoring device is reduced.

4. After receiving the identifier of the target storage node fed back by the target management node, the monitoring device may send the storage request to the target storage node. The storage request may be considered as the second storage request.

The target storage node may receive the second storage request for allocating the storage position to the monitoring device. There may be at least two manners for receiving the second storage request. In a first receiving manner, which corresponds to the first manner for acquiring the first storage request by the target management node, the monitoring device directly sends the second storage request to the target storage node. In a second receiving manner, which corresponds to the second manner for acquiring the first storage request by the target management node, the storage system 100 further includes the access node; the monitoring device sends the second storage request to the access node, and then the access node sends the second storage request to the target storage node.

For the first receiving manner, the monitoring device and the target storage node are communicated. The second storage request received by the target storage node is directly from the monitoring device. In other words, the monitoring device directly sends the second storage request to the target storage node. For the second receiving manner, the second storage request received by the target storage node is directly from the access node. In other words, the access node directly sends the second storage request to the target storage node. This receiving manner will be described in the following implementation and will not be described here.

Each of the storage nodes includes at least two storage volumes. Each storage volume includes at least two block groups configured for storing monitoring data. After receiving the second storage request from the monitoring device, the target storage node may allocate a target storage volume from storage volumes thereof to the monitoring device according to the preset storage volume allocation policy. Then, the target storage node allocates a target block group from the block groups contained in the target storage volume to the monitoring device. The target storage block group is a storage position for storing the monitoring data of the monitoring device.

The storage volume allocation policy and the block group allocation policy will be described in the following implementation, and will not be described here.

After determining the target block group, the target storage node may store the monitoring data of the monitoring device. The target storage node may actively acquire the monitoring data from the monitoring device.

There may be at least two manners for actively acquiring the monitoring data by the target storage node. In a first manner, which corresponds to the first receiving manner for receiving the second storage request, the target storage node actively acquires the monitoring data directly from the monitoring device. In a second manner, which corresponds to the second receiving manner for receiving the second storage request, the storage system 100 further includes the access node; the access node actively acquires the monitoring data from the monitoring device, and then the access node sends the acquired monitoring data to the target storage node for storage. The second manner will be described in an embodiment of the access node, and will not be described here.

In an implementation, the monitoring data acquired from the monitoring device by the target storage node may be in the form of a data stream. For the first manner, the target storage node directly acquires the monitoring data in the form of a data stream from the monitoring device and stores the monitoring data in the form of a data stream in the target block group. For the second manner, the access node actively acquires the monitoring data in the form of a data stream from the monitoring device and sends the monitoring data in the form of a data stream to the target storage node for storage.

The monitoring data in the form of a data stream is transmitted through a streaming standard protocol, for example, RTSP (Real Time Streaming Protocol).

In the implementation, a standard streaming protocol may be used. A standard streaming protocol is more common and widely used. Especially in a security monitoring field, the real-time transmission and storage of data can be achieved in the form of a data stream through a standard streaming protocol to some extent. A user may view a monitoring video and a live-streaming video in real-time and the monitoring video can be played back more smoothly.

In a technical solution according to the embodiment of the present application, the target management node in the management cluster acquires the first storage request for allocating the storage node to the monitoring device and allocates the target storage node in the resource pool to the monitoring device. After receiving the second storage request for allocating the storage position to the monitoring device, the target storage node allocates the target storage volume from the storage volumes thereof and allocates the target storage block group from the block groups contained in the target storage volume to the monitoring device. The target storage node acquires the monitoring data in the form of a data stream from the monitoring device and stores the monitoring data in the target block group. Through a technical solution according to the embodiment of the present application, a management node may selected from a management cluster for allocating a storage node to a monitoring device, and then a storage position may be allocated by the storage node to the monitoring device. In view of this, the storage position that is allocated to the monitoring data may be determined by both of the management node and the storage node hierarchically and a different management node may be selected for each storage request. In this way, the load pressure of management nodes in the management cluster is reduced.

In an implementation, the storage system 100 further includes an access node. The access node may be mounted on the storage node. Alternatively, the access node may be a standalone device.

The storage system 100 may include at least two access nodes. Each of the access nodes is allocated to a certain number of the monitoring devices according to a preset access node allocation policy. In an implementation, a monitoring platform delivers a recording plan for the monitoring devices to the storage system 100. According to the recording plan, the access nodes are allocated to the monitoring devices based on the preset access node allocation policy. Each monitoring device corresponds to at least one access node.

The recording plan includes a start time plan for each monitoring device. For example, the monitoring device may be set to continuously record video for 24 hours. The monitoring device may be set to start recording only during a preset time period. For example, a monitoring device for company access control may start recording during an off-hours from 17:00 pm to 9:00 am; some monitoring devices for some road sections in a traffic monitoring system may start recording in the morning peak and evening peak. In addition, the monitoring device may be set to start recording when detecting a preset event, for example, detecting a human activity.

The preset access node allocation policy may be based on a load balance rule, i.e., for access nodes in the storage system 100, the numbers of monitoring devices allocated to individual access nodes are the same. Even though the numbers are different, the difference between the numbers falls within a threshold value range. In this way, the balance of the load pressures of individual access nodes can be ensured.

For example, the number of monitoring devices is 300 and the recording plan is 24-hour continuous recording. The storage system 100 includes three access nodes. 100 monitoring devices are allocated to each access node based on the load balance rule.

In a case where the storage system 100 includes an access node, there are two cases for acquiring the first storage request. In a first case, the first storage request is generated and sent by the monitoring device. The monitoring device sends the first storage request to the target access node. The monitoring device is allocated to the target access node based on the preset access node allocation policy. In a second case, the first storage request is generated and sent by the target access node.

The two cases are described respectively as follows.

1. First Case

After receiving the first storage request, the target access node sends the first storage request to the target management node. The implementation for determining the target management node in the management cluster 110 may be referred to descriptions regarding the management cluster 110, which is not described here.

The target access node may receive the identifier of the target storage node sent by the target management node and forward the identifier to the monitoring device. The target storage node is a storage node allocated by the target management node to the monitoring device. Information is transmitted between the monitoring device and the target management node via the target access node. The access nodes involved in the storage system 100 helps reduce the load pressures of individual management nodes in the management cluster 110.

After receiving the identifier of the target storage node forwarded by the target access node, the monitoring device may learn the allocated storage node and send the second storage request to the target access node. After receiving the second storage request, the target access node forwards the second storage request to the target storage node. In this way, after receiving the storage request of the monitoring device, the target storage node may allocate the storage position to the monitoring device, wherein, the storage position allocated by the target storage node is the target block group.

After the target storage node determines the target block group, the target access node may actively acquire the monitoring data from the monitoring device and send the monitoring data to the target block group for storage. In an implementation, the monitoring data in the form of a data stream may be acquired and sent to the target block group. The monitoring data may be transmitted in the form of a data stream through a streaming standard protocol, such as RTSP (Real Time Streaming Protocol), omif, private SDK protocol and the like.

2. Second Case

The first storage request is generated by the target access node based on the acquired recording plan corresponding to the monitoring device. After generating the first storage request, the target access node sends the first storage request to the target management node. The target management node allocates the target storage node and sends the identifier of the target storage node to the target access node. Of course, the target access node is an access node allocated to the monitoring device according to the preset access node allocation policy.

After acquiring the identifier of the target storage node, the target access node may generate the second storage request for allocating the storage position to the monitoring device and send the second storage request to the target storage node corresponding to the identifier.

After the target storage node receives the second storage request and allocates the storage position, the target access node may actively connect to the monitoring device and actively acquire the monitoring data in the form of a data stream from the connected monitoring device, and then send the acquired monitoring data in the form of a data stream to the target block group for storage. The target block group is a storage position allocated by the target storage node to the monitoring device.

A standard streaming protocol is more commonly and widely used. Especially in a security monitoring field, it is possible to perform the real-time transmission and storage of data in the form of a data stream through the standard protocol to some extent. A user may view a monitoring video and a live-streaming video in real-time and the monitoring video may be played back more smoothly.

In an implementation, the management node allocation policy may be determined according to at least one of the following information: a management node(s) that has been allocated to a monitoring device(s), a keep-alive status of each management node in the management cluster 110, and a load pressure of each management node in the management cluster 110.

The three management node allocation policies will be described respectively in the following.

1. The management node allocation policy is based on the management node(s) that has been allocated to the monitoring device(s).

In an implementation, a program for determining the target management node in the storage system 100 may record an identifier of a management node allocated to the monitoring device each time. To avoid a problem that each storage request is responded by the same management node, in determining a target management node, a management node different from a management node that has been allocated to a monitoring device last time may be selected in the management cluster 110 as the target management node.

For example, the management cluster 110 includes a management node 1, a management node 2, a management node 3, a management node 4, and a management node 5. The management node that has been allocated to a monitoring device last time is the management node 1. In the management node allocation process this time, any of the management node 2, the management node 3, the management node 4 and management node 5 may be selected as the target management node.

In an implementation, in determining a target management node, a management node different from management nodes that have been allocated in previous multiple allocation processes may be selected in the management cluster 110. The number of previous multiple allocation processes may be customized.

For example, the management cluster 110 includes a management node 1, a management node 2, a management node 3, a management node 4, and a management node 5. The management nodes allocated to the monitoring device in three allocation processes before a management node allocation process this time are the management node 1, the management node 2, and the management node 3 in order.

Therefore, in the management node allocation process this time, any of the management node 4 and management node 5 may be selected as the target management node to avoid a situation that the target management node is the same as the management nodes allocated in the previous three allocation processes.

To ensure the load balance of each management node in the management cluster 110, the rotation policy may be used for the allocation of management nodes. An identifier order table may be preset. The identifier order table records an order of identifiers corresponding to the management nodes contained in the management cluster 110. A rule for ordering the identifiers can be customized. The allocation of a management node each time may be implemented according to the identifier order table. The identifier of the management node allocated each time is a next identifier of an identifier corresponding to the management node allocated last time in the identifier order table.

For example, the management cluster 110 includes a management node 1, a management node 2, a management node 3, a management node 4, and a management node 5. The order recorded in the preset identifier order table is 1, 2, 3, 4, and 5. The management node allocated last time is the management node 2, i.e., its corresponding identifier is 2. Therefore, in the allocation of a management node this time, a management node whose identifier is 3 is selected as the target management node according to the identifier order table. In other words, the selected target management node this time is the management node 3.

2. The management node allocation policy is based on the keep-alive status of each management node in the management cluster 110.

The keep-alive status of a management node is a failed status or a non-failed status of the management node.

The management node may periodically report the keep-alive status thereof to a monitoring platform and a program responsible for the allocation of management nodes. In this way, in the allocation of management nodes, the program can exclude the failed management nodes timely, and thus determine the target management node from the non-failed management nodes, which improves the storage efficiency of the storage system 110.

For example, the management cluster 110 includes a management node 1, a management node 2, a management node 3, a management node 4, and a management node 5. The management node 1 and the management node 2 are the failed management nodes. Therefore, the target management node may be selected from the management node 3, the management node 4, and the management node 5.

3. The management node allocation policy is based on the load pressure of each management node in the management cluster 110.

The load pressures of all management nodes in the management cluster 110 may be sorted. A management node with a small load pressure may be preferentially selected as the target management node. In this way, after each time a management node is allocated, an order of the load pressures of all management nodes may be updated. The acquired new order of the load pressures may be used as a basis for allocating a management node for the next time. In this way, the load pressures of all management nodes in the management cluster 110 can be balanced.

For example, the management cluster 110 includes a management node 1, a management node 2, a management node 3, a management node 4, and a management node 5. An order of the load pressures of these five management nodes from small to big is the management node 4, the management node 2, the management node 1, the management node 3, and the management node 5. Therefore, in allocating a management node, the management node 4 with the smallest load pressure will be selected as the target management node.

Of course, for the above three kinds of information, each of them can be separately used as a basis of the management node allocation policy. Alternatively, a combination of any two of them or the three kinds of information can be used as a basis of the management node allocation policy. This is not limited herein.

For example, the management cluster 110 includes five management nodes. In allocating a management node, a management node with the smallest load pressure and different from the selected management node last time is used as the target management node.

In an implementation, the storage node allocation policy may be determined according to at least one of the following information: a storage node(s) that has been allocated to a monitoring device(s), a keep-alive status of each storage node in the resource pool 120, a remaining storage space of each storage node in the resource pool 120, a load pressure of each storage node in the resource pool 120.

The four storage node allocation policies will be described respectively below.

1. The storage node allocation policy is based on the storage node(s) that has been allocated to the monitoring device(s).

The target management node may record an identifier of a storage node allocated to the monitoring device each time.

In an implementation, the storage node allocation policy is a centralization policy. That is, in allocating a storage node to a monitoring device, the target management node may select the same storage node as the storage node allocated to the monitoring device last time.

For example, the resource pool 120 includes a storage node 1, a storage node 2, a storage node 3, a storage node 4, and a storage node 5. The storage node allocated to the monitoring device last time, which is recorded by the target management node, is the storage node 1. In allocating a storage node to the monitoring device this time, the target management node still selects the storage node 1 as the target storage node.

In a case where the storage node that is allocated to the monitoring device last time fails or the storage space thereof is full, the storage node that is allocated to the monitoring device last time cannot be used as the target storage node. In this case, a storage node can be re-allocated through other bases of the storage node allocation policy.

For example, a storage node may be arbitrarily selected from other non-failed storage nodes contained in the resource pool 120 as the target storage node. Further, a storage node with the largest remaining space may be selected from other storage nodes contained in the resource pool 120 as the target storage node. Further, a storage node with the smallest load pressure may be selected from other storage nodes contained in the resource pool 120 as the target storage node.

In an implementation, the storage node allocation policy is a dispersive policy. That is, in allocating a storage node to the monitoring device, the target management node may select a storage node different from the storage node(s) that has been previously allocated to the monitoring device(s). There are at least the following two cases. In a first case, a storage node different from the storage node allocated to the monitoring device last time may be selected. In a second case, a storage node different from the storage nodes that have been allocated to the monitoring devices in previous multiple allocation processes may be selected.

The two cases will be described respectively below.

In the first case, in allocating a storage node to the monitoring device, the target management node may select a storage node different from the storage node allocated to the monitoring device last time. In other words, the storage node being allocated is different from the storage node allocated to the monitoring device last time.

For example, the resource pool 120 includes a storage node 1, a storage node 2, a storage node 3, a storage node 4, and a storage node 5. The storage node allocated to the monitoring device last time, which is recorded by the target management node, is the storage node 1. In allocating a storage node to the monitoring device this time, the target management node may select any of the storage node 2, the storage node 3, the storage node 4, and the storage node 5 as the target storage node.

In the second case, in allocating a storage node to the monitoring device, the target management node may select a storage node different from the storage nodes that have been allocated to the monitoring devices in the previous multiple allocation processes. The number of the previous multiple allocation processes may be customized.

For example, the resource pool 120 includes a storage node 1, a storage node 2, a storage node 3, a storage node 4, and a storage node 5. The storage nodes allocated by the target management node in the previous three allocation processes are the storage node 1, the storage node 2, and the storage node 3 in order. In allocating a storage node to the monitoring device this time, the target management node may select any of the storage node 4 and the storage node 5 as the target storage node, so as to avoid a situation that the storage node allocated this time is the same as any of the storage nodes allocated in the previous three allocation processes.

Based on the implementation, the target management node may use the rotation policy to allocate a storage node, so that the monitoring data is dispersedly stored in the storage nodes contained in the resource pool 120.

An identifier order table for all storage nodes contained in the resource pool 120 may be preset. The identifier order table records an order of identifiers corresponding to the storage nodes contained in the resource pool 120. A rule for ordering the identifiers may be customized. The target management node may allocate a storage node according to the identifier order table each time. Also, the identifier of the allocated storage node each time is a next identifier of an identifier corresponding to the allocated storage node last time in the identifier order table.

For example, the resource pool 120 includes a storage node 1, a storage node 2, a storage node 3, a storage node 4, and a storage node 5. The order recorded in the identifier order table for the storage nodes is 1, 2, 3, 4, and 5. The storage node allocated by the target management node last time is the storage node 2, i.e., its corresponding identifier is 2. Therefore, in allocating a storage node this time, the target management node selects a storage node corresponding to identifier 3 as the target storage node according to the identifier order table. In other words, the target storage node selected by the target management node this time is the storage node 3.

2. The storage node allocation policy is based on the keep-alive status of each storage node in the resource pool 120.

The keep-alive status of a storage node is a failed status or a non-failed status of the storage node.

The storage node may periodically report the keep-alive status thereof to the monitoring platform. The target management node may learn the keep-alive status of each storage node in real-time. In this way, in allocating a storage node, the target management node may timely exclude the failed storage nodes, and thus determine the target storage node from the non-failed storage nodes, which can improve the allocation efficiency of the storage resources, and can improve the storage efficiency of the storage system 100.

For example, the resource pool 120 includes a storage node 1, a storage node 2, a storage node 3, a storage node 4, and a storage node 5. The storage node 1 and the storage node 2 are the failed storage nodes. Therefore, in allocating a storage node, the target management node selects a storage node from the storage node 3, the storage node 4, and the storage node 5.

3. The storage node allocation policy is based on the remaining storage space of each storage node in the resource pool 120.

The remaining storage spaces of all storage nodes may be sorted. A storage node with a larger remaining storage space may be preferentially selected as the target storage node. In this way, after allocating the storage node each time, the target management node may update the order of the remaining storage spaces of all storage nodes. The updated order of the remaining storage spaces may be used as a basis for allocating a storage node for the next time. In this way, the remaining storage spaces of all storage nodes in the resource pool 120 can be balanced.

For example, the resource pool 120 includes a storage node 1, a storage node 2, a storage node 3, a storage node 4, and a storage node 5. The remaining storage space of the storage node 1 is 900M, the remaining storage space of the storage node 2 is 1000M, the remaining storage space of the storage node 3 is 700M, the remaining storage space of the storage node 4 is 600M, and the remaining storage space of the storage node 5 is 1200M. Therefore, an order of the remaining storage spaces of these five storage nodes from big to small is the storage node 5, the storage node 2, the storage node 1, the storage node 3, and the storage node 4. Therefore, in the allocation of a storage node, the target management node will select the storage node 5 with the largest remaining storage space as the target storage node.

4. The storage node allocation policy is based on the load pressure of each storage node in the resource pool 120.

The load pressures of all storage nodes in the resource pool 120 may be sorted. A storage node with a small load pressure may be preferentially selected as the target storage node. In this way, after allocating a storage node each time, the target management node may update an order of the load pressures of all storage nodes. The updated order of the load pressures may be used as a basis for allocating a storage node for the next time. In this way, the load pressures of the individual storage nodes in the resource pool 120 can be balanced.

For example, the resource pool 120 includes a storage node 1, a storage node 2, a storage node 3, a storage node 4, and a storage node 5. An order of load pressures of these five storage nodes from small to big is the storage node 4, the storage node 2, the storage node 1, the storage node 3, and the storage node 5. Therefore, in the allocation of a storage node, the target management node will select the storage node 4 with the smallest load pressure as the target storage node.

For the above four kinds of information, each of them may be separately used as a basis of the storage node allocation policy. Alternatively, a combination of any two, three, or four of them may be used as a basis of the storage node allocation policy. This is not limited here.

For example, the resource pool 120 includes five storage nodes. In the allocation of a storage node, the target management node may select a storage node with the smallest load pressure and the largest remaining storage space as the target storage node.

In an implementation, the storage volume allocation policy may be determined according to at least one of the following information: a storage volume(s) that has been allocated to a monitoring device(s), a keep-alive status of each storage volume in the target storage node, a remaining storage space of each storage volume in the target storage node, a load pressure of each storage volume in the target storage node.

The four storage volume allocation policies will be described respectively below.

1. The storage volume allocation policy is based on the storage volume(s) that has been allocated to the monitoring device(s).

The target storage node may record an identifier of a storage volume allocated to the monitoring device each time.

In an implementation, the storage volume allocation policy is a centralization policy. That is, in allocating a storage volume to a monitoring device, the target storage node may select a same storage volume as the storage volume allocated to the monitoring device last time.

For example, the target storage node includes a storage volume 1, a storage volume 2, a storage volume 3, a storage volume 4, and a storage volume 5. The storage volume allocated to the monitoring device last time, which is recorded by the target storage node, is the storage volume 1. In allocating a storage volume to a monitoring device this time, the target storage node still selects the storage volume 1 as the target storage volume.

In a case where the storage volume that is allocated to the monitoring device last time fails or the storage space thereof is full, the storage volume that is allocated to the monitoring device last time cannot be used as the target storage volume. In this case, a storage volume may be re-allocated through other bases of the storage volume allocation policy.

For example, a storage volume may be arbitrarily selected from other non-failed storage volumes contained in the target storage node as the target storage volume. Further, a storage volume with the largest remaining space may be selected from other storage volumes contained in the target storage node as the target storage volume. In addition, a storage volume with the smallest load pressure may be selected from other storage volumes contained in the target storage node as the target storage volume.

In an implementation, the storage volume allocation policy is a dispersive policy. That is, in allocating a storage volume to a monitoring device, the target storage node may select a storage volume different from the storage volume(s) previously allocated to the monitoring device(s). There may be two cases. In a first case, a storage volume different from the storage volume allocated to the monitoring device last time is selected. In a second case, a storage volume different from the storage volumes that have been allocated to the monitoring devices in previous multiple allocation processes.

The two cases will be described respectively below.

In the first case, in allocating a storage volume to a monitoring device, the target storage node may select a storage volume different from the storage volume allocated to the monitoring device last time. In other words, the storage volume being allocated is different from the storage volume allocated to the monitoring device last time.

For example, the target storage node includes a storage volume 1, a storage volume 2, a storage volume 3, a storage volume 4, and a storage volume 5. The storage volume allocated to the monitoring device last time, which is recorded by the target storage node, is the storage volume 1. In allocating a storage volume to a monitoring device, the target storage node may select any of the storage volume 2, the storage volume 3, the storage volume 4, and the storage volume 5 as the target storage volume.

In the second case, in allocating a storage volume to a monitoring device, the target storage node may select a storage volume different from the storage volumes that have been allocated to the monitoring devices in previous multiple allocation processes. The number of the previous multiple allocation processes may be customized.

For example, the target storage node includes a storage volume 1, a storage volume 2, a storage volume 3, a storage volume 4, and a storage volume 5. The storage volumes allocated by the target storage node in the previous three allocation processes are the storage volume 1, the storage volume 2, and the storage volume 3 in order. In allocating a storage volume this time, the target storage node may select any one of the storage volume 4 and the storage volume 5 as the target storage volume, so as to avoid a situation that the storage volume allocated this time is the same as the allocated storage volumes in the previous three allocation processes.

Based on the implementation, the target storage node may use the rotation policy to allocating a storage volume, so that the monitoring data is dispersedly stored in the storage volumes contained in the target storage node.

An identifier order table for all storage volumes contained in the target storage node may be preset. The identifier order table records an order of identifiers corresponding to the storage volumes contained in the target storage node. A rule of ordering the identifiers may be customized. The target storage node may allocate a storage volume according to the identifier order table each time, and the identifier of the allocated storage volume each time is a next identifier of an identifier corresponding to the allocated storage volume last time in the identifier order table.

For example, the target storage node includes a storage volume 1, a storage volume 2, a storage volume 3, a storage volume 4, and a storage volume 5. The order recorded in the identifier order table for the storage volumes is 1, 2, 3, 4, and 5. The storage volume allocated by the target storage node last time is the storage volume 2, i.e., its corresponding identifier is 2. Therefore, in allocating a storage volume this time, the target storage node selects a storage volume corresponding to identifier 3 as the target storage volume according to the identifier order table. In other words, the target storage volume allocated by the target storage node this time is the storage volume 3.

2. The storage volume allocation policy is based on the keep-alive status of each storage volume in the target storage node.

The keep-alive status of a storage volume is a failed status or a non-failed status of the storage volume.

The target storage node can learn the keep-alive status of each storage volume in real-time. In this way, in the allocation of a storage volume, the target storage node may timely exclude the failed storage volumes, and thus determine the target storage volume from the non-failed storage volumes. This can improve the allocation efficiency of the storage resources, and thus improve the storage efficiency of the storage system 100.

For example, the target storage node includes a storage volume 1, a storage volume 2, a storage volume 3, a storage volume 4, and a storage volume 5. The storage volume 1 and the storage volume 2 are the failed storage volumes. Therefore, in allocating a storage volume, the target storage node selects a storage volume among the storage volume 3, the storage volume 4, and the storage volume 5.

3. The storage volume allocation policy is based on the remaining storage space of each storage volume in the target storage node.

The remaining storage spaces of all storage volumes can be sorted. A storage volume with a larger remaining storage space may be preferentially selected as the target storage volume. After allocating a storage node each time, the target storage node may update an order of the remaining storage spaces of all storage volumes. The updated order of the remaining storage spaces can be used as a basis for allocating a storage volume for the next time. In this way, the remaining storage spaces of the individual storage volumes in the target storage node can be balanced.

For example, the target storage node includes a storage volume 1, a storage volume 2, a storage volume 3, a storage volume 4, and a storage volume 5. The remaining storage space of the storage volume 1 is 400M, the remaining storage space of the storage volume 2 is 500M, the remaining storage space of the storage volume 3 is 200M, the remaining storage space of the storage volume 4 is 100M, and the remaining storage space of the storage volume 5 is 700M. Therefore, an order of remaining storage spaces of these five storage volumes from big to small is the storage volume 5, the storage volume 2, the storage volume 1, the storage volume 3, and the storage volume 4. Therefore, in allocating a storage volume, the target storage node will select the storage volume 5 with the largest remaining storage space as the target storage volume.

4. The storage volume allocation policy is based on the load pressure of each storage volume in the target storage node.

The load pressures of all storage volumes in the target storage node can be sorted. A storage volume with a small load pressure may be preferentially selected as the target storage volume. After allocating a storage volume each time, the target storage node may update an order of the load pressures of all storage volumes. The updated order of the load pressures may be used as a basis for allocating a storage volume for the next time. In this way, the load pressures of the individual storage volumes in the target storage node can be balanced.

For example, the target storage node includes a storage volume 1, a storage volume 2, a storage volume 3, a storage volume 4, and a storage volume 5. An order of the load pressures of these five storage volumes from small to big is the storage volume 4, the storage volume 2, the storage volume 1, the storage volume 3, and the storage volume 5. Therefore, in allocating a storage volume, the target storage node selects the storage volume 4 with the smallest load pressure as the target storage volume.

For the four kinds of information, each of them may be separately used as a basis of the storage volume allocation policy. Alternatively, a combination of any two, three, or four of them can be used as a basis of the storage volume allocation policy. This is not limited herein.

For example, the target storage node includes five storage volumes. In allocating a storage volume, the target storage node may select a storage volume with the smallest load pressure and the largest remaining storage space as the target storage volume.

In an implementation, the block group allocation policy may be determined according to at least one of the following information: a block group(s) that has been allocated to a monitoring device(s), a keep-alive status of each block group in the target storage volume, a remaining storage space of each block group in the target storage volume, and a load pressure of each block group in the target storage volume.

The four block group allocation policies will be described respectively below.

1. The block group allocation policy is based on the block group(s) that has been allocated to the monitoring device(s).

The target storage node may record an identifier of a block group allocated to the monitoring device each time.

In an implementation, the block group allocation policy is a centralization policy. That is, in allocating a block group to the monitoring device, the target storage node may select a same block group as that allocated to the monitoring device last time.

For example, the target storage volume includes a block group 1, a block group 2, a block group 3, a block group 4, and a block group 5. The block group allocated to the monitoring device last time, which is recorded by the target storage node, is the block group 1. In allocating a block group to the monitoring device this time, the target storage node still selects the block group 1 as the target block group.

Of course, in a case where the block group that is allocated last time fails or the storage space thereof is full, the block group that is allocated last time cannot be used as the target block group. In this case, a block group can be re-allocated through other bases of the block group allocation policy.

For example, a block group may be arbitrarily selected from other non-failed block groups contained in the target storage volume as the target block group. Further, a block group with the largest remaining space may be selected from other block groups contained in the target storage volume as the target block group. In addition, a block group with the smallest load pressure may be selected from other block groups contained in the target storage volume as the target block group.

In an implementation, the target storage node may use the rotation policy to allocating a block group.

An identifier order table for all block groups contained in the target storage volume can be preset. The identifier order table records an order of identifiers corresponding to all block groups contained in the target storage volume. A rule of ordering the identifiers may be customized. The target storage node allocating a block group according to the identifier order table each time, and the identifier of the allocated block group each time is a next identifier of an identifier corresponding to the allocated block group last time in the identifier order table.

For example, the target storage volume includes a block group 1, a block group 2, a block group 3, a block group 4, and a block group 5. The order recorded in the identifier order table for the block groups is 1, 2, 3, 4, and 5. The block group allocated by the target storage node last time is the block group 2, i.e., its corresponding identifier is 2. Therefore, in allocating a block group this time, the target storage node selects a block group corresponding to identifier 3 as the target block group according to the identifier order table. In other words, the target block group selected by the target storage node this time is the block group 3.

2. The block group allocation policy is based on the keep-alive status of each block group in the target storage volume.

The keep-alive status of a block group is a failed status or a non-failed status of the block group.

The target storage node may learn the keep-alive status of each block group in real-time. In allocating a block group, the target storage node may timely exclude the failed block groups, and thus determine the target block group from the non-failed block groups. This can improve the allocation efficiency of the storage resources, and thus improve the storage efficiency of the storage system 100.

For example, the target storage volume includes a block group 1, a block group 2, a block group 3, a block group 4, and a block group 5. The block group 1 and the block group 2 are the failed block groups. Therefore, in allocating a block group, the target storage node selects a block group among the block group 3, the block group 4, and the block group 5.

3. The block group allocation policy is based on the remaining storage space of each block group in the target storage volume.

The remaining storage spaces of all block groups can be sorted. A block group with a larger remaining storage space may be preferentially selected as the target block group. In this way, after allocating a block group each time, the target storage node may update an order of the remaining storage spaces of all block groups. The updated order of the remaining storage spaces may be used as a basis for allocating a block group for the next time. In this way, the remaining storage spaces of the respective block groups in the target storage volume can be balanced.

For example, the target storage volume includes a block group 1, a block group 2, a block group 3, a block group 4, and a block group 5. The remaining storage space of the block group 1 is 70M, the remaining storage space of the block group 2 is 80M, the remaining storage space of the block group 3 is 60M, the remaining storage space of the block group 4 is 50M, and the remaining storage space of the block group 5 is 90M. Therefore, an order of remaining storage spaces of these five block groups from big to small is the block group 5, the block group 2, the block group 1, the block group 3, and the block group 4. Therefore, in allocating a block group, the target storage node will select the block group 5 with the largest remaining storage space as the target block group.

4. The block group allocation policy is based on the load pressure of each block group in the target storage volume.

The load pressures of all block groups in the target storage volume can be sorted. A block group with a small load pressure may be preferentially selected as the target block group. In this way, after allocating a block group each time, the target storage node may update an order of the load pressures of all block groups. The updated order of the load pressures can be used as a basis for allocating a block group for the next time. In this way, the load pressures of the individual block groups in the target storage volume can be balanced.

For example, the target storage node includes a block group 1, a block group 2, a block group 3, a block group 4, and a block group 5. An order of load pressures of these five block groups from small to big is the block group 4, the block group 2, the block group 1, the block group 3, and the block group 5. Therefore, in allocating a block group, the target storage node selects the block group 4 with the smallest load pressure as the target block group.

For the four kinds of information, each of them can be separately used as a basis of the block group allocation policy. Alternatively, a combination of any two, three or four of them can be used as a basis of the block group allocation policy. This is not limited herein.

For example, the target storage volume includes five block groups. In allocating a block group, the target storage node may select a block group with the smallest load pressure and the largest remaining storage space as the target block group.

Furthermore, in the present embodiment, one storage volume may store monitoring data of different monitoring devices. The monitoring data of different monitoring devices may be stored in different block groups in the storage volume.

In an implementation, the target storage node may detect the remaining storage space of the target block group in real-time in a process that the target storage node acquires the monitoring data in the form of a data stream from the monitoring device and sends the monitoring data to the block group. The target storage node stops acquiring the monitoring data in the form of a data stream from the monitoring device and sends a re-request instruction to the monitoring device when detecting an insufficient remaining storage space of the target block group, i.e., the storage space of the block group is full.

The re-request instruction is an instruction for instructing the monitoring device to re-request storage resources from the management node. In other words, after receiving the re-request instruction, the monitoring device needs to re-request storage resources from the storage system 100. Therefore, the monitoring device re-sends the first storage request to the target management node.

Through a technical solution according to the embodiment of the present application, a management node may be selected from a management cluster to allocate a storage node to a monitoring device, and then a storage position may be allocated by the storage node to the monitoring device. In view of this, the storage position that is allocated to the monitoring data can be determined by both of the management node and the storage node hierarchically. Furthermore, it is possible to select a different management node for each storage request. In this way, the load pressures of the management nodes in the management cluster are reduced.

Figure 2:
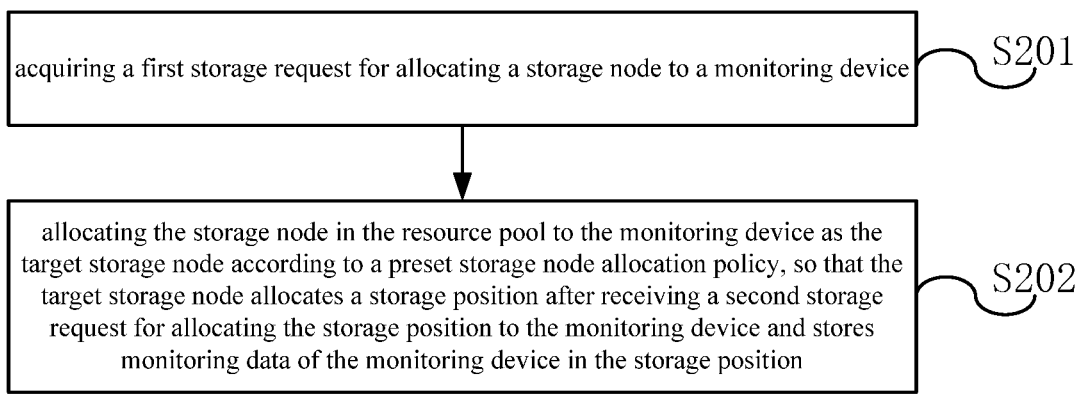
FIG. 2 is a flowchart of a method for allocating storage resources according to an embodiment of the present application.

Corresponding to the system embodiment, an embodiment of the present application further provides a method for allocating storage resources. As shown in FIG. 2, the method is applied to the target management node in the storage system 100. The storage system 100 further includes: a resource pool 120. The resource pool 120 includes at least two storage nodes. The method includes:

S201, acquiring a first storage request for allocating a storage node to a monitoring device; and S202, allocating a storage node in the resource pool 120 to the monitoring device as a target storage node according to a preset storage node allocation policy, so that the target storage node allocates a storage position after receiving a second storage request for allocating the storage position to the monitoring device and stores monitoring data of the monitoring device in the storage position.

The method embodiment corresponds to the system embodiment corresponding to FIG. 1 described above. For this method embodiment, reference may be made to the system embodiment corresponding to FIG. 1, which will not be described here.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. Furthermore, a different management node can be selected for each storage request. In this way, the load pressures of the management nodes in the management cluster are reduced.

Optionally, in an implementation, the storage system 100 may further include: an access node.

The step S201 of acquiring a first storage request for allocating a storage node to a monitoring device may include:

receiving the first storage request sent by a target access node, wherein, the target access node is an access node allocated to the monitoring device according to a preset access node allocation policy, and the first storage request is a storage request sent by the monitoring device to the target access node or a storage request generated by the target access node.

Furthermore, the target management node may further feed an identifier of the target storage node back to the monitoring device. In a case where the storage system 100 further includes the access node, the feeding may specifically include:

sending the identifier of the target storage node to the access node, so that the access node sends the identifier to the monitoring device after receiving the identifier.

This implementation corresponds to the second implementation described above. For this implementation, reference may be made to the second implementation described above, which will not be described here.

Optionally, in an implementation, a management node allocation policy is determined according to at least one of the following information:

a management node(s) that has been allocated to a monitoring device;

a keep-alive status of each management node in the management cluster 110; and a load pressure of each management node in the management cluster 110.

This implementation corresponds to the third implement described above. For this implementation, reference may be made to the third implementation described above, which will not be described here.

Optionally, in an implementation, a storage node allocation policy is determined according to at least one of the following information:

a storage node(s) that has been allocated to a monitoring device;

a keep-alive status of each storage node in the resource pool 120;

a remaining storage space of each storage node in the resource pool 120; and a load pressure of each storage node in the resource pool 120.

Based on the implementation, in an implementation, in a case where the storage node allocation policy is determined according to the storage node(s) that has been allocated to the monitoring device, the step 202 of allocating a storage node in the resource pool 120 to the monitoring device as the target storage node according to a preset storage node allocation policy may include:

determining a storage node allocated to the monitoring device last time as a first storage node; and allocating a second storage node in the resource pool 120 to the monitoring device as the target storage node according to a preset identifier order table, wherein the identifier order table records an order of identifiers corresponding to the storage nodes in the resource pool 120; the second storage node is a node corresponding to a second identifier in the identifier order table; the second identifier is a next identifier of an identifier corresponding to the first storage node in the identifier order table.

These two implementations correspond to the implementations described above. For these implementations, reference may be made to the implementations described above, which will not be described here.

Optionally, in an implementation, a storage volume allocation policy is determined according to at least one of the following information:

a storage volume(s) that has been allocated to a monitoring device;

a keep-alive status of each storage volume in the target storage node;

a remaining storage space of each storage volume in the target storage node; and a load pressure of each storage volume in the target storage node.

This implementation corresponds to the implementation described above. For this implementation, reference may be made to the implementation described above, which will not be described here.

Optionally, in an implementation, a block group allocation policy is determined according to at least one of the following information:

a block group(s) that has been allocated to a monitoring device;

a keep-alive status of each block group in the target storage volume;

a remaining storage space of each block group in the target storage volume; and a load pressure of each block group in the target storage volume.

This implementation corresponds to the implementation described above. For this implementation, reference may be made to the implementation described above, which will not be described here.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of management nodes in the management cluster are reduced.

Figure 3:
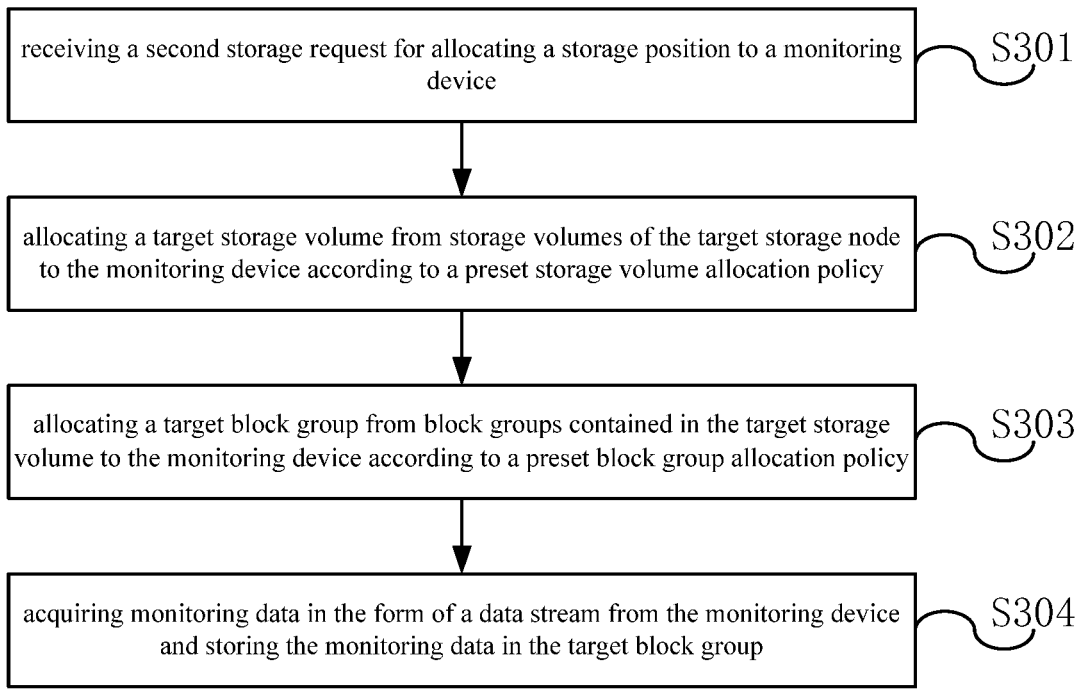
FIG. 3 is another flowchart of a method for allocating storage resources according to an embodiment of the present application.

Corresponding to the system embodiment, an embodiment of the present application further provides a method for allocating storage resources. As shown in FIG. 3, the method is applied to the target storage node in the storage system 100. The storage system 100 includes a management cluster 110 and a resource pool 120. The management cluster 110 includes at least one management node. The resource pool 120 includes at least two storage nodes. The target storage node is a storage node allocated by the management node to the monitoring device. The method includes:

S301, receiving a second storage request for allocating a storage position to the monitoring device;

S302, allocating a target storage volume from storage volumes of the target storage node to the monitoring device according to a preset storage volume allocation policy;

S303, allocating a target block group from block groups contained in the target storage volume to the monitoring device according to a preset block group allocation policy; and S304, acquiring monitoring data in the form of a data stream from the monitoring device and storing the monitoring data in the target block group.

The method embodiment corresponds to the system embodiment corresponding to FIG. 1 described above. For this method embodiment, reference may be made to the system embodiment corresponding to FIG. 1, which will not be described here.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of management nodes in the management cluster are reduced.

Optionally, in an implementation, the storage system 100 may further include: an access node.

The S301 of receiving a second storage request for allocating a storage position to a monitoring device may include:

receiving the second storage request sent by a target access node, wherein, the target access node is an access node allocated to the monitoring device according to a preset access node allocation policy, and the second storage request is a storage request sent by the monitoring device to the target access node or a storage request generated by the target access node.

The S304 of acquiring monitoring data in the form of a data stream from the monitoring device and storing the monitoring data in the target block group may include:

receiving the monitoring data sent in the form of a data stream sent by the access node and storing the monitoring data in the target block group, wherein, the monitoring data is data acquired by the target access node from the monitoring device in the form of a data stream.

This implementation corresponds to the implementation described above. For this implementation, reference may be made to the implementation described above, which will not be described here.

Optionally, in an implementation, a management node allocation policy is determined according to at least one of the following information:

a management node(s) that has been allocated to a monitoring device;

a keep-alive status of each management node in the management cluster 110; and a load pressure of each management node in the management cluster 110.

This implementation corresponds to the implementation described above. For this implementation, reference may be made to the implementation described above, which will not be described here.

Optionally, in an implementation, a storage node allocation policy is determined according to at least one of the following information:

a storage node(s) that has been allocated to a monitoring device;

a keep-alive status of each storage node in the resource pool 120;

a remaining storage space of each storage node in the resource pool 120; and a load pressure of each storage node in the resource pool 120.

This implementation corresponds to the implementation described above. For this implementation, reference may be made to the implementation described above, which will not be described here.

Optionally, in an implementation, a storage volume allocation policy is determined according to at least one of the following information:

a storage volume(s) that has been allocated to a monitoring device;

a keep-alive status of each storage volume in the target storage node;

a remaining storage space of each storage volume in the target storage node; and a load pressure of each storage volume in the target storage node.

This implementation corresponds to the implementation described above. For this implementation, reference may be made to the implementation described above, which will not be described here.

Optionally, in an implementation, a block group allocation policy is determined according to at least one of the following information:

a block group(s) that has been allocated to a monitoring device;

a keep-alive status of each block group in the target storage volume;

a remaining storage space of each block group in the target storage volume; and a load pressure of each block group in the target storage volume.

This implementation corresponds to the implementation described above. For this implementation, reference may be made to the implementation described above, which will not be redundantly described here.

Optionally, in an implementation, the method may further include:

detecting whether a storage space of the target block group is full in a storage process; and when the storage space of the target block group is full, sending a re-request instruction to the monitoring device, wherein the re-request instruction is an instruction instructing the monitoring device to re-request storage resources from the management node.

This implementation corresponds to the implementation described above. For this implementation, reference may be made to the implementation described above, which will not be described here.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Figure 4:
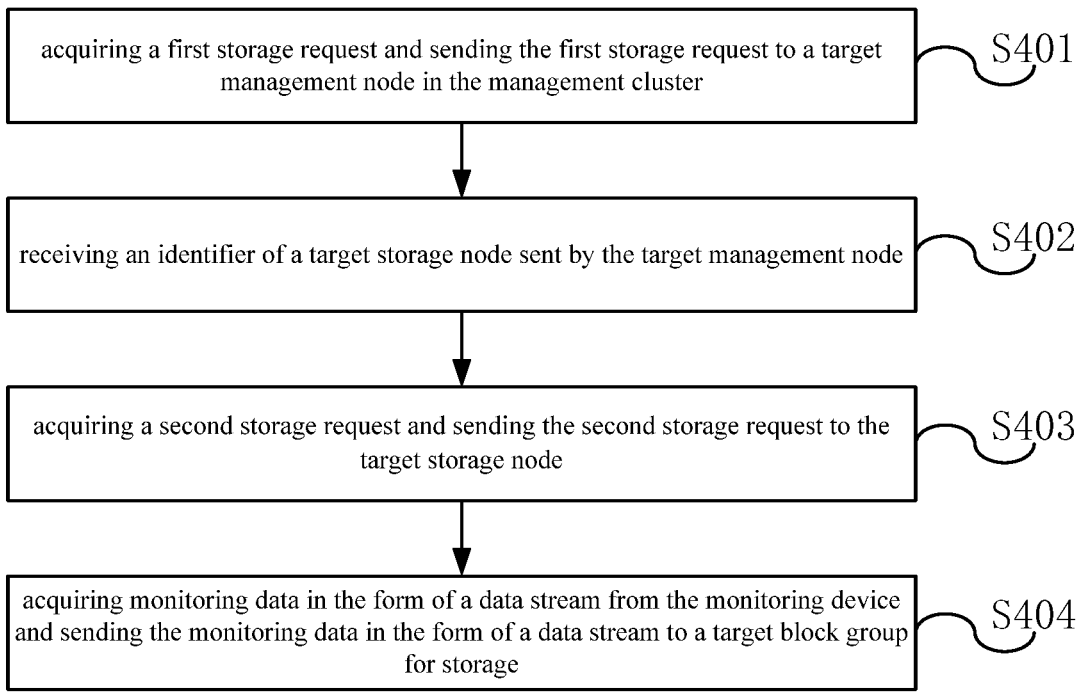
FIG. 4 is another flowchart of a method for allocating storage resources according to an embodiment of the present application.

Corresponding to the system embodiment, an embodiment of the present application further provides a method for allocating storage resources. As shown in FIG. 4, the method is applied to a target access node in the storage system. The storage system includes a management cluster and a resource pool. The resource pool includes at least two storage nodes. The target access node is an access node allocated to the monitoring device according to a preset access node allocation policy. The method includes the following steps.

S401, acquiring a first storage request and sending the first storage request to a target management node in the management cluster.

The first storage request is a request for allocating a storage node to a monitoring device.

S402, receiving an identifier of a target storage node sent by the target management node.

The target storage node is a storage node allocated by the target management node to the monitoring device.

S403, acquiring a second storage request and sending the second storage request to the target storage node.

The second storage request is a request for allocating a storage position to the monitoring device.

S404, acquiring monitoring data in the form of a data stream from the monitoring device and sending the monitoring data in the form of a data stream to a target block group for storage.

This method embodiment corresponds to the implementation described above. For this method embodiment, reference may be made to the implementation described above, which will not be described here.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of management nodes in the management cluster are reduced.

Optionally, in an implementation, acquiring the first storage request may include:

receiving the first storage request sent by the monitoring device; or generating the first storage request according to an acquired recording plan corresponding to the monitoring device.

Optionally, in an implementation, acquiring the second storage request may include:

receiving the second storage request sent by the monitoring device; or generating the second storage request.

The two implementations in the method embodiment correspond to the implementations described above. For the two implementations, reference may be made to the implementations described above, which will not be described here.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Figure 5:
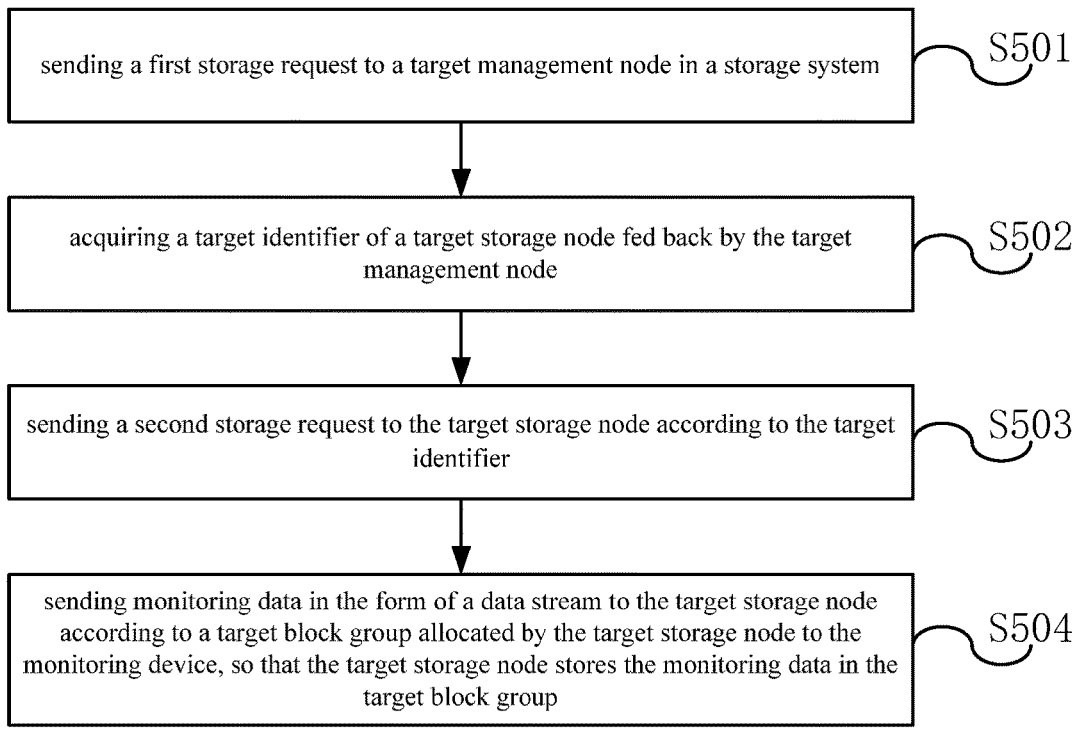
FIG. 5 is another flowchart of a method for allocating storage resources according to an embodiment of the present application.

Corresponding to the system embodiment, an embodiment of the present application further provides a method for allocating storage resources. As shown in FIG. 5, the method is applied to a monitoring device, and includes the following steps.

S501, sending a first storage request to a target management node in a storage system 100.

The storage system 100 includes a management cluster 110 and a resource pool 120. The management cluster 110 includes at least one management node, and the resource pool 120 includes at least two storage nodes. The first storage request is a request for allocating a storage node to a monitoring device. The target management node is a management node determined from the management cluster 110 according to a preset management node allocation policy.

S502, acquiring a target identifier of a target storage node fed back by the target management node.

The target storage node is a storage node allocated by the target management node to the monitoring device according to a preset storage node allocation policy.

S503, sending a second storage request to the target storage node according to the target identifier.

The second storage request is a request for allocating a storage position to the monitoring device.

S504, sending the monitoring data in the form of a data stream to the target storage node according to a target block group allocated by the target storage node to the monitoring device, so that the target storage node stores the monitoring data in the target block group.

The target block group is a block group that is allocated by the target storage node to the monitoring device from block groups contained in the target storage volume according to a preset block group allocation policy. The target storage volume is a target storage volume that is allocated by the target storage node to the monitoring device from storage volumes thereof according to a preset storage volume allocation policy.

The method embodiment corresponds to the system embodiment corresponding to FIG. 1 described above. For this method embodiment, reference may be made to the system embodiment corresponding to FIG. 1, which will not be described here.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Optionally, in an implementation, the storage system 100 further includes: an access node.

The S501 of sending a first storage request to a target management node in a storage system 100 may include:

sending, by the monitoring device, the first storage request to the access node, and forwarding, by the access node, the first storage request to the target management node in the storage system 100.

The storage system 100 includes: a management cluster 110 and a resource pool 120. The management cluster 110 includes at least one management node, and the resource pool 120 includes at least two storage nodes. The target management node is a management node determined from the management cluster 110 according to a preset management node allocation policy. The target access node is an access node allocated to the monitoring device according to a preset access node allocation policy.

The S502 of acquiring a target identifier of the target storage node fed back by the target management node may include:

receiving the target identifier of the target storage node sent by the access node, wherein, the target identifier is sent to the access node by the target management node; and the target storage node is a storage node that is allocated by the target management node to the monitoring device according to a preset storage node allocation policy.

The S503 of sending a second storage request to the target storage node according to the target identifier may include:

sending the second storage request to the access node, and forwarding, by the access node, the second storage request to the target storage node.

The S504 of sending the monitoring data in the form of a data stream to the target storage node according to a target block group allocated by the target storage node to the monitoring device, so that the target storage node stores the monitoring data in the target block group may include:

actively acquiring, by the access node, the monitoring data in the form of a data stream from the monitoring device and sending the monitoring data in the form of a data stream to the target storage node, so that the target storage node stores the monitoring data in the target block group.

This implementation corresponds to the implementation described above. For this implementation, reference may be made to the implementation described above, which will not be described here.

Optionally, in an implementation, a management node allocation policy is determined according to at least one of the following information:

a management node(s) that has been allocated to a monitoring device;

a keep-alive status of each management node in the management cluster 110; and a load pressure of each management node in the management cluster 110.

This implementation corresponds to the implementation described above. For this implementation, reference may be made to the implementation described above, which will not be described here.

Optionally, in an implementation, a storage node allocation policy is an allocation policy determined according to at least one of the following information:

a storage node(s) that has been allocated to a monitoring device;

a keep-alive status of each storage node in the resource pool 120;

a remaining storage space of each storage node in the resource pool 120; and a load pressure of each storage node in the resource pool 120.

This implementation corresponds to the implementation described above. For this implementation, reference may be made to the implementation described above, which will not be described here.

Optionally, in an implementation, a storage volume allocation policy is determined according to at least one of the following information:

a storage volume(s) that has been allocated to a monitoring device;

a keep-alive status of each storage volume in the target storage node;

a remaining storage space of each storage volume in the target storage node; and a load pressure of each storage volume in the target storage node.

This implementation corresponds to the implementation described above. For this implementation, reference may be made to the implementation described above, which will not be described here.

Optionally, in an implementation, a block group allocation policy is determined according to at least one of the following information:

a block group(s) that has been allocated to a monitoring device;

a keep-alive status of each block group in the target storage volume;

a remaining storage space of each block group in the target storage volume; and a load pressure of each block group in the target storage volume.

This implementation corresponds to the implementation described above. For this implementation, reference may be made to the implementation described above, which will not be described here.

Optionally, in an implementation, the method may further include:

receiving a re-request instruction sent by the target storage node, wherein the re-request instruction is an instruction instructing the monitoring device to re-request storage resources from the management node; and performing the step of sending the first storage request to the target management node in the storage system 100 (S501).

This implementation corresponds to the implementation described above. For this implementation, reference may be made to the implementation described above, which will not be described here.

Optionally, in an implementation, before sending the first storage request to the target management node in the storage system 100 (S501), the method may include the following steps.

In a first step, keep-alive information of the management node is acquired.

The keep-alive information of the management node includes keep-alive status of the management node. The keep-alive status of the management node is a failed status or a non-failed status of the management node. The management node may periodically report the keep-alive status thereof to a monitoring platform and a program responsible for allocating a management node. Therefore, the monitoring device may acquire the keep-alive information of the management node in the management cluster 110 from the monitoring platform. Furthermore, the monitoring device may acquire the keep-alive information of the management node in the management cluster 110 from the program responsible for allocating a management node.

In a second step, in a case where the keep-alive information indicates that at least one management node in the management cluster 110 keeps alive, the step (S501) of sending the first storage request to the target management node in the storage system 100 is performed.

In a case where the keep-alive information indicates that no keep-alive management node exists in the management cluster 110, a recorded identifier is acquired as a target identifier, and the step (S503) of sending the second storage request to the target storage node according to the target identifier is performed. The recorded identifier is an identifier of the storage node that has been allocated by the management node to the monitoring device.

Each time after acquiring the identifier of the target storage node allocated by the management node, the monitoring device can record and store the identifier. In a case where the content of the keep-alive information acquired by the monitoring device is that no keep-alive management node exists in the management cluster 110, i.e., no available management node exists in the management cluster 110, the monitoring device acquires any one of the recorded identifiers as the target identifier. A storage node corresponding to the target identifier is the target storage node. The monitoring device then sends the second storage request to the target storage node corresponding to the target identifier.

Through the solution of the implementation, a strong centralization of a management node in the storage system 100 is weakened, so as to reduce a dependency on the management node. Even if in a case where the management node fails, the monitoring device still can directly request storage resources from the storage node.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Figure 6:
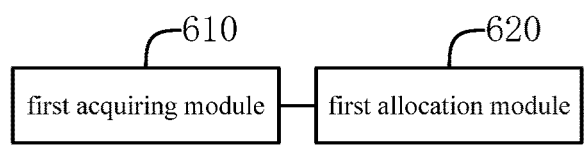
FIG. 6 is a structural diagram of an apparatus for allocating storage resources according to an embodiment of the present application.

In correspondence with FIG. 2 and the embodiment corresponding to FIG. 2, an embodiment of the present application further provides an apparatus for allocating storage resources. As shown in FIG. 6, the apparatus is applied to a target management node in the storage system 100. The storage system 100 further includes a resource pool 120 including at least two storage nodes. The apparatus includes:

a first acquiring module 610 configured for acquiring a first storage request for allocating a storage node to a monitoring device;

a first allocation module 620 configured for allocating the storage node in the resource pool 120 to the monitoring device as a target storage node according to a preset storage node allocation policy, so that the target storage node allocates a storage position after receiving a second storage request for allocating the storage position to the monitoring device and stores monitoring data of the monitoring device in the storage position.

In an implementation, the storage node allocation policy is determined according to at least one of:

a storage node(s) that has been allocated to the monitoring device;

a keep-alive status of each of the storage nodes in the resource pool 120;

a remaining storage space of each of the storage nodes in the resource pool 120; and a load pressure of each of the storage nodes in the resource pool 120.

Optionally, in an implementation, in case the storage node allocation policy is determined according to the storage node(s) that has been allocated to the monitoring device, the first allocation module 620 may include:

a determining sub-module configured for determining a storage node allocated to the monitoring device last time as a first storage node; and an allocation sub-module configured for allocating a second storage node in the resource pool 120 to the monitoring device as the target storage node according to a preset identifier order table, wherein, the identifier order table records an order of identifiers corresponding to the storage nodes in the resource pool 120; the second storage node is a node corresponding to a second identifier in the identifier order table; the second identifier is a next identifier of an identifier corresponding to the first storage node in the identifier order table.

Optionally, in an implementation, the storage system 100 may further include an access node(s).

The first acquiring module 610 may include:

a first receiving sub-module configured for receiving the first storage request sent by a target access node, wherein, the target access node is an access node that is allocated to the monitoring device according to a preset access node allocation policy, and the first storage request is a storage request sent by the monitoring device to the target access node or a storage request generated by the target access node.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Figure 7:
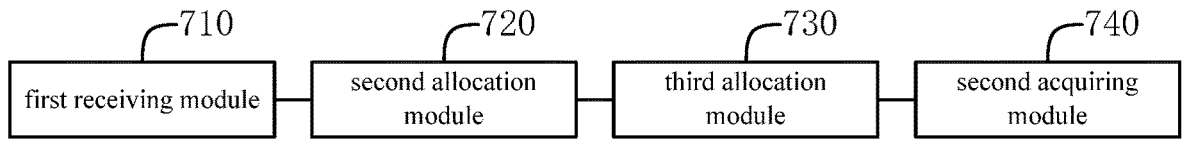
FIG. 7 is another structural diagram of an apparatus for allocating storage resources according to an embodiment of the present application.

In correspondence to FIG. 3 and the embodiment corresponding to the FIG. 3, an embodiment of the present application further provides an apparatus for allocating storage resources. As shown in FIG. 7, the apparatus is applied to a target storage node in the storage system 100. The storage system 100 includes a management cluster 110 and a resource pool 120. The management cluster 110 includes at least one management node. The resource pool 120 includes at least two storage nodes. The target storage node is a storage node allocated by the management node to the monitoring device. The apparatus includes:

a first receiving module 710 configured for receiving a second storage request for allocating a storage position to the monitoring device;

a second allocation module 720 configured for allocating a target storage volume from storage volumes of the target storage node to the monitoring device according to a preset storage volume allocation policy;

a third allocation module 730 configured for allocating a target block group from block groups contained in the target storage volume to the monitoring device according to a preset block group allocation policy;

a second acquiring module 740 configured for acquiring monitoring data in the form of a data stream from the monitoring device and storing the monitoring data in the target block group.

Optionally, in an implementation, the apparatus may further include:

a detection module configured for detecting whether a storage space of the target block group is full during storage;

a first sending module configured for when the detection module detects that the storage space of the target block group is full, sending a re-request instruction to the monitoring device, wherein the re-request instruction is an instruction for instructing the monitoring device to re-request storage resources from the management node.

Optionally, in an implementation, the storage volume allocation policy is determined according to at least one of:

a storage volume(s) that has been allocated to the monitoring device;

a keep-alive status of each storage volume in the target storage node;

a remaining storage space of each storage volume in the target storage node; and a load pressure of each storage volume in the target storage node.

Optionally, in an implementation, the storage system 100 may further include an access node(s). The first receiving module 710 may include:

a second receiving sub-module configured for receiving the second storage request sent by a target access node, wherein, the target access node is an access node that is allocated to the monitoring device according to a preset access node allocation policy, and the second storage request is a storage request sent by the monitoring device to the target access node or a storage request generated by the target access node.

The second acquiring module 740 may include:

a third receiving sub-module configured for receiving the monitoring data in the form of a data stream sent by the target access node and storing the monitoring data in the target block group, wherein, the monitoring data is data that is acquired by the target access node in the form of a data stream from the monitoring device.

Optionally, in an implementation, the block group allocation policy is determined according to at least one of:

a block group(s) that has been allocated to the monitoring device;

a keep-alive status of each block group in the target storage volume;

a remaining storage space of each block group in the target storage volume; and a load pressure of each block group in the target storage volume.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Figure 8:
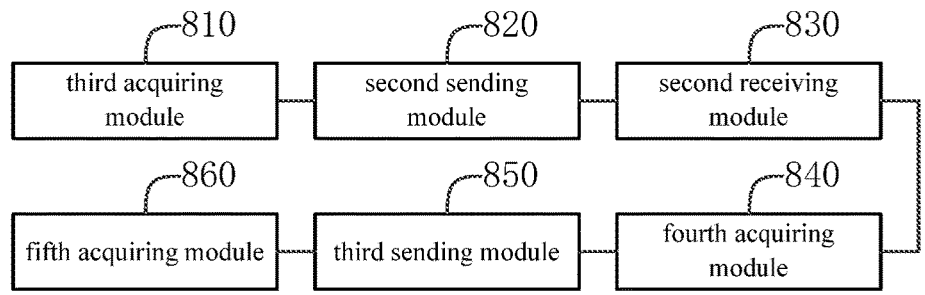
FIG. 8 is another structural diagram of an apparatus for allocating storage resources according to an embodiment of the present application.

In correspondence with FIG. 4 and the embodiment corresponding to FIG. 4, an embodiment of the present application further provides an apparatus for allocating storage resources. As shown in FIG. 8, the apparatus is applied to a target access node in the storage system. The storage system includes a management cluster and a resource pool. The resource pool includes at least two storage nodes. The target access node is an access node that is allocated to the monitoring device according to a preset access node allocation policy. The apparatus includes:

a third acquiring module 810 configured for acquiring a first storage request, wherein the first storage request is a request for allocating a storage node to the monitoring device;

a second sending module 820 configured for sending the first storage request to a target management node in the management cluster;

a second receiving module 830 configured for receiving an identifier of a target storage node sent by the target management node, wherein the target storage node is a storage node allocated by the target management node to the monitoring device;

a fourth acquiring module 840 configured for acquiring a second storage request, wherein the second storage request is a request for allocating a storage position to the monitoring device;

a third sending module 850 configured for sending the second storage request to the target storage node;

a fifth acquiring module 860 configured for acquiring monitoring data in the form of a data stream from the monitoring device and sending the monitoring data in the form of a data stream to a target block group for storage.

Optionally, in an implementation, the third acquiring module 810 may be further configured for:

receiving the first storage request sent by the monitoring device; or generating the first storage request according to an acquired recording plan corresponding to the monitoring device.

Optionally, in an implementation, the fourth acquiring module 840 may be further configured for:

receiving the second storage request sent by the monitoring device; or generating the second storage request.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Figure 9:
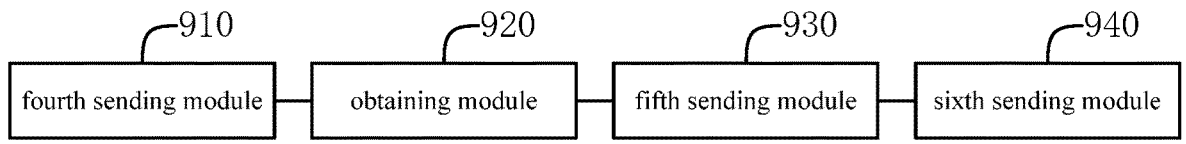
FIG. 9 is another structural diagram of an apparatus for allocating storage resources according to an embodiment of the present application.

In correspondence with FIG. 5 and the embodiment corresponding to FIG. 5, an embodiment of the present application further provides an apparatus for allocating storage resources. As shown in FIG. 9, the apparatus is used to a monitoring device. The apparatus includes:

a fourth sending module 910 configured for sending a first storage request to a target management node in a storage system 100, wherein the storage system 100 includes a management cluster 110 and a resource pool 120; the management cluster 110 includes at least one management node; the resource pool 120 includes at least two storage nodes; the first storage request is a request for allocating a storage node to the monitoring device; and the target management node is a management node that is determined from the management cluster 110 according to a preset management node allocation policy;

an obtaining module 920 configured for obtaining a target identifier of a target storage node fed back by the target management node, wherein, the target storage node is a storage node that is allocated by the target management node to the monitoring device according to a preset storage node allocation policy;

a fifth sending module 930 configured for sending a second storage request to the target storage node according to the target identifier, wherein the second storage request is a request for allocating a storage position to the monitoring device;

a sixth sending module 940 configured for sending monitoring data in the form of a data stream to the target storage node according to a target block group allocated by the target storage node to the monitoring device, so that the target storage node stores the monitoring data in the target block group, wherein, the target block group is a block group that is allocated by the target storage node to the monitoring device from block groups contained in a target storage volume according to a preset block group allocation policy, and the target storage volume is allocated by the target storage node from storage volumes of the target storage node to the monitoring device according to a preset storage volume allocation policy.

Optionally, in an implementation, the block group allocation policy is determined according to at least one of:

a block group(s) that has been allocated to the monitoring device;

a keep-alive status of each block group in the target storage volume;

a remaining storage space of each block group in the target storage volume; and a load pressure of each block group in the target storage volume.

Optionally, in an implementation, the apparatus may further include:

a sixth acquiring module configured for acquiring keep-alive information of the management node, and in case the keep-alive information indicates that at least one management node in the management cluster 110 keeps alive, triggering the fourth sending module;

a seventh acquiring module configured for in case the keep-alive information indicates that no keep-alive management node exists in the management cluster 110, acquiring a recorded identifier as the target identifier and triggering the fifth sending module, wherein, the recorded identifier is an identifier of a storage node that has been allocated by the management node to the monitoring device.

Optionally, in an implementation, the apparatus may further include:

a third receiving module configured for receiving a re-request instruction sent by the target storage node and triggering the fourth sending module, wherein, the re-request instruction is an instruction for instructing the monitoring device to re-request storage resources from the management node.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Figure 10:
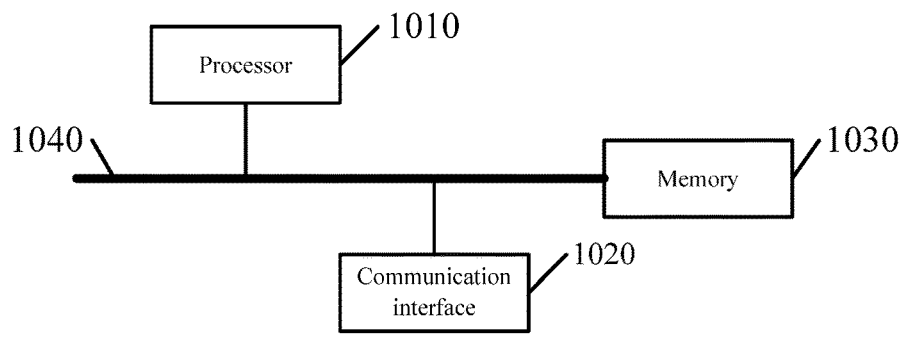
FIG. 10 is a structural diagram of an electronic device according to an embodiment of the present application.

An embodiment of the present application provides an electronic device. As shown in FIG. 10, the device includes a processor 1010, a communication interface 1020, a memory 1030 and a communication bus 1040. The processor 1010, the communication interface 1020 and the memory 1030 communicate with each other via the communication bus 1040.

The memory 1030 is configured for storing a computer program.

The processor 1010 is configured for performing, when executing the program stored on the memory 1030, operations of:

acquiring a first storage request for allocating a storage node to a monitoring device; and allocating the storage node in the resource pool 120 to the monitoring device as a target storage node according to a preset storage node allocation policy, so that the target storage node allocates a storage position after receiving a second storage request for allocating the storage position to the monitoring device and stores monitoring data of the monitoring device in the storage position.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Of course, the electronic device according to the embodiment of the present application may further perform a method for allocating storage resources according to any one of the embodiments described above. For details, reference is made to FIG. 2 and the embodiment corresponding to FIG. 2, which will not described here.

Another embodiment of the present application further provides a computer-readable storage medium having stored instructions thereon. The instructions are executed by a computer so as to cause the computer to perform any one of the methods for allocating storage resources shown in FIG. 2 and the embodiments corresponding to FIG. 2.

An embodiment of the present application further provides an electronic device, which may perform operations of:

receiving a second storage request for allocating a storage position to the monitoring device;

allocating a target storage volume from storage volumes of the target storage node to the monitoring device according to a preset storage volume allocation policy;

allocating a target block group from block groups contained in the target storage volume to the monitoring device according to a preset block group allocation policy; and acquiring monitoring data in the form of a data stream from the monitoring device and storing the monitoring data in the target block group.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Of course, the electronic device according to the embodiment of the present application may further perform a method for allocating storage resources according to any one of the embodiments described above. For details, reference is made to FIG. 3 and the embodiment corresponding to FIG. 3, which will not described here.

Another embodiment of the present application further provides a computer-readable storage medium having stored instructions thereon. The instructions are executed by a computer so as to cause the computer to perform any one of the methods for allocating storage resources shown in FIG. 3 and the embodiments corresponding to FIG. 3.

An embodiment of the present application further provides an electronic device, which may perform operations of:

acquiring a first storage request and sending the first storage request to a target management node in the management cluster, wherein the first storage request is a request for allocating a storage node to the monitoring device;

receiving an identifier of a target storage node sent by the target management node, wherein the target storage node is a storage node allocated by the target management node to the monitoring device;

acquiring a second storage request and sending the second storage request to the target storage node, wherein the second storage request is a request for allocating a storage position to the monitoring device; and acquiring monitoring data in the form of a data stream from the monitoring device and sending the monitoring data in the form of a data stream to a target block group for storage.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Of course, the electronic device according to the embodiment of the present application may further perform a method for allocating storage resources according to any one of the embodiments described above. For details, reference is made to FIG. 4 and the embodiment corresponding to FIG. 4, which will not described here.

Another embodiment of the present application further provides a computer-readable storage medium having stored instructions thereon. The instructions are executed by a computer so as to cause the computer to perform any one of the methods for allocating storage resources shown in FIG. 4 and the embodiments corresponding to FIG. 4.

An embodiment of the present application further provides an electronic device, which may perform operations of:

sending a first storage request to a target management node in a storage system 100, wherein the storage system 100 includes a management cluster 110 and a resource pool 120; the management cluster 110 includes at least one management node; the resource pool 120 includes at least two storage nodes; the first storage request is a request for allocating a storage node to the monitoring device; and the target management node is a management node that is determined from the management cluster 110 according to a preset management node allocation policy;

acquiring a target identifier of a target storage node fed back by the target management node, wherein, the target storage node is a storage node that is allocated by the target management node to the monitoring device according to a preset storage node allocation policy;

sending a second storage request to the target storage node according to the target identifier, wherein the second storage request is a request for allocating a storage position to the monitoring device; and sending monitoring data in the form of a data stream to the target storage node according to a target block group allocated by the target storage node to the monitoring device, so that the target storage node stores the monitoring data in the target block group, wherein, the target block group is a block group that is allocated by the target storage node to the monitoring device from block groups contained in a target storage volume according to a preset block group allocation policy, and the target storage volume is allocated by the target storage node from storage volumes of the target storage node to the monitoring device according to a preset storage volume allocation policy.

Through a technical solution according to the embodiment of the present application, a management node can be selected from a management cluster to allocate a storage node to a monitoring device, and then a storage position can be allocated by the storage node to the monitoring device. In view of this, the storage position that is allocated to monitoring data can be determined by both of the management node and the storage node hierarchically. A different management node can be selected for each storage request. In this way, the load pressures of the management nodes in the management cluster are reduced.

Of course, the electronic device according to the embodiment of the present application may further perform a method for allocating storage resources according to any one of the embodiments described above. For details, reference is made to FIG. 5 and the embodiment corresponding to FIG. 5, which will not described here.

Another embodiment of the present application further provides a computer-readable storage medium having stored instructions thereon. The instructions are executed by a computer so as to cause the computer to perform any one of the methods for allocating storage resources shown in FIG. 5 and the embodiments corresponding to FIG. 5.

The communication bus aforementioned in the electronic device may be a peripheral component interconnect (PCI) bus or an extended industry standard architecture (EISA) bus or the like. The communication bus may be an address bus, a data bus, a control bus, or the like. For easy of representation, one thick line is shown in the figure, which does not mean there is only one communication bus or one type of communication bus.

The communications interface is used for communication between the electronic device and other devices.

The memory may include a random access memory (RAM), or may include a non-volatile memory (NVM), for example at least one disk memory. Optionally, the memory may also be at least one storage device located away from the processor.

The processor described above may be a general-purpose processor, such as a central processing unit (CPU), a network processor (NP), etc.; it may also be a digital signal processor (DSP), an application specific integrated circuit (ASIC), a field-programmable gate array (FPGA) or other programmable logic devices, discrete gate or transistor logic devices, discrete hardware components.

It should be noted that the relationship terms used herein, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus and the method are described briefly, since they are substantially similar to the embodiment of the system, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A storage system, comprising: a management cluster and a resource pool, wherein the management cluster comprises at least one management node; and the resource pool comprises at least two storage nodes;
   a target management node in the management cluster acquires a first storage request for allocating a storage node to a monitoring device; and allocates the storage node in the resource pool to the monitoring device as a target storage node according to a preset storage node allocation policy, wherein, the target management node is a management node that is determined from the management cluster according to a preset management node allocation policy;
   the target storage node receives a second storage request for allocating a storage position to the monitoring device; allocates a target storage volume from storage volumes of the target storage node to the monitoring device according to a preset storage volume allocation policy; allocates a target block group from block groups contained in the target storage volume to the monitoring device according to a preset block group allocation policy; and acquires monitoring data in the form of a data stream from the monitoring device and stores the monitoring data in the target block group;
   the storage system further comprises an access node(s), wherein a target access node receives the first storage request sent by the monitoring device and sends the first storage request to the target management node; receives an identifier of the target storage node sent by the target management node and sends the identifier to the monitoring device; receives the second storage request sent by the monitoring device and sends the second storage request to the target storage node; acquires the monitoring data in the form of a data stream from the monitoring device and sends the monitoring data in the form of a data stream to the target block group for storage, wherein, the target access node is an access node that is allocated to the monitoring device according to a preset access node allocation policy.

2. The system of claim 1, further comprising: an access node(s),
   wherein a target access node generates the first storage request according to an acquired recording plan corresponding to the monitoring device, sends the first storage request to the target management node, and receives an identifier of the target storage node sent by the target management node; generates the second storage request, and sends the second storage request to the target storage node; connects to the monitoring device, acquires monitoring data in the form of a data stream from the monitoring device, and sends the monitoring data in the form of a data stream to the target block group for storage, wherein, the target access node is an access node that is allocated to the monitoring device according to a preset access node allocation policy.

3. The system of claim 1, wherein the management node allocation policy is determined according to at least one of:
 a management node(s) that has been allocated to the monitoring device;
 a keep-alive status of each management node in the management cluster; and
 a load pressure of each management node in the management cluster.

4. The system of claim 1, wherein, the target storage node is further configured for detecting whether a storage space of the target block group is full during storage; and sending a re-request instruction to the monitoring device when detecting that the storage space of the target block group is full, wherein, the re-request instruction is an instruction for instructing the monitoring device to re-request storage resources from the management node.

5. A method for allocating storage resources, which is applied to a target management node in a storage system, wherein the storage system further comprises a resource pool comprising at least two storage nodes;
 wherein the method comprises:
 acquiring a first storage request for allocating a storage node to a monitoring device; and
 allocating the storage node in the resource pool to the monitoring device as a target storage node according to a preset storage node allocation policy, so that the target storage node allocates a storage position after receiving a second storage request for allocating the storage position to the monitoring device and stores monitoring data of the monitoring device in the storage position;
 wherein, the storage system further comprises an access node(s);
 acquiring the first storage request for allocating the storage node to the monitoring device comprises:
 receiving the first storage request sent by a target access node, wherein, the target access node is an access node that is allocated to the monitoring device according to a preset access node allocation policy, and the first storage request is a storage request sent by the monitoring device to the target access node or a storage request generated by the target access node.

6. The method of claim 5, wherein, the storage node allocation policy is determined according to at least one of:
 a storage node(s) that has been allocated to the monitoring device;
 a keep-alive status of each of the storage nodes in the resource pool;
 a remaining storage space of each of the storage nodes in the resource pool; and
 a load pressure of each of the storage nodes in the resource pool.

7. The method of claim 6, wherein, in case the storage node allocation policy is determined according to the storage node(s) that has been allocated to the monitoring device, allocating the storage node in the resource pool to the monitoring device as the target storage node according to the preset storage node allocation policy comprises:
 determining a storage node allocated to the monitoring device last time as a first storage node; and
 allocating a second storage node in the resource pool to the monitoring device as the target storage node according to a preset identifier order table, wherein, the identifier order table records an order of identifiers corresponding to the storage nodes in the resource pool; the second storage node is a node corresponding to a second identifier in the identifier order table; the second identifier is a next identifier of an identifier corresponding to the first storage node in the identifier order table.

8. A method for allocating storage resources, which is applied to a monitoring device, comprising:
 sending a first storage request to a target management node in a storage system, wherein the storage system comprises a management cluster and a resource pool; the management cluster comprises at least one management node; the resource pool comprises at least two storage nodes; the first storage request is a request for allocating a storage node to the monitoring device; and the target management node is a management node that is determined from the management cluster according to a preset management node allocation policy;
 acquiring a target identifier of a target storage node fed back by the target management node, wherein, the target storage node is a storage node that is allocated by the target management node to the monitoring device according to a preset storage node allocation policy;
 sending a second storage request to the target storage node according to the target identifier, wherein the second storage request is a request for allocating a storage position to the monitoring device; and
 sending monitoring data in the form of a data stream to the target storage node according to a target block group allocated by the target storage node to the monitoring device, so that the target storage node stores the monitoring data in the target block group, wherein, the target block group is a block group that is allocated by the target storage node to the monitoring device from block groups contained in a target storage volume according to a preset block group allocation policy, and the target storage volume is allocated by the target storage node from storage volumes of the target storage node to the monitoring device according to a preset storage volume allocation policy;
 wherein, before sending the first storage request to the target management node in the storage system, the method further comprises:
 acquiring keep-alive information of the management node;
 in case the keep-alive information indicates that at least one management node in the management cluster keeps alive, performing the step of sending a first storage request to a target management node in the storage system;
 in case the keep-alive information indicates that no keep-alive management node exists in the management cluster, acquiring a recorded identifier as the target identifier, and performing the step of sending a second storage request to a target storage node according to the target identifier, wherein, the recorded identifier is an identifier of a storage node that has been allocated by the management node to the monitoring device.

9. The method of claim 8, further comprising:
- receiving a re-request instruction sent by the target storage node, wherein, the re-request instruction is an instruction for instructing the monitoring device to re-request storage resources from the management node; and
- performing the step of sending a first storage request to a target management node in the storage system.

10. An electronic device, comprising a processor, a communication interface, a memory, and a communication bus, wherein the processor, the communication interface, and the memory communicate with each other via the communication bus;
- the memory is configured for storing a computer program;
- the processor is configured for performing the method of claim 5 when executing the program stored on the memory.

11. A non-transitory computer-readable storage medium having stored a computer program thereon, wherein the computer program is executed by a processor, so as to cause the processor to perform the method of claim 5.

12. An electronic device, comprising a processor, a communication interface, a memory, and a communication bus, wherein the processor, the communication interface, and the memory communicate with each other via the communication bus;
- the memory is configured for storing a computer program;
- the processor is configured for performing the method of claim 8 when executing the program stored on the memory.

* * * * *